(12) United States Patent
Overton

(10) Patent No.: US 7,823,713 B1
(45) Date of Patent: Nov. 2, 2010

(54) HYDRAULIC CLUTCH WITH EXPANSION RING ASSEMBLY

(75) Inventor: Alan Overton, Erie, CO (US)

(73) Assignee: Drussel Wilfley Design LLC, Greenwood Village, CO (US)

( * ) Notice: Subject to any disclaimer, the term of this patent is extended or adjusted under 35 U.S.C. 154(b) by 0 days.

(21) Appl. No.: 12/816,390

(22) Filed: Jun. 16, 2010

(51) Int. Cl.
F16D 43/08 (2006.01)
F16D 25/08 (2006.01)

(52) U.S. Cl. ............ 192/85.5; 192/70; 192/70.23; 192/85.55; 192/103 A; 192/105 B

(58) Field of Classification Search ........... 192/85.5, 192/85.53, 85.55, 70, 103 A, 105 B; 60/584
See application file for complete search history.

(56) References Cited

U.S. PATENT DOCUMENTS

| | | | | |
|---|---|---|---|---|
| 1,994,588 A * | 3/1935 | Nakashian | ........... | 192/105 B |
| 2,235,107 A * | 3/1941 | Kreis | ........... | 192/105 B |
| 2,690,826 A * | 10/1954 | Stelzel | ........... | 192/105 B |
| 2,729,320 A * | 1/1956 | Henrickson | ........... | 192/105 B |
| 4,285,422 A * | 8/1981 | Bentley | ........... | 192/105 B |
| 6,119,821 A * | 9/2000 | Chiang | ........... | 188/351 |
| 6,227,342 B1 | 5/2001 | Armbruster et al. | | |
| 6,336,525 B1 * | 1/2002 | Leng | ........... | 188/352 |
| 6,533,056 B1 | 3/2003 | Maimone | | |
| 6,705,446 B2 | 3/2004 | Drussel et al. | | |
| 6,931,956 B2 | 8/2005 | Thery | | |
| 6,957,730 B1 | 10/2005 | Youngwerth | | |
| 7,014,026 B2 | 3/2006 | Drussel et al. | | |
| 2008/0264754 A1 | 10/2008 | Ogasawara et al. | | |
| 2008/0308380 A1 | 12/2008 | Youngwerth, Jr. et al. | | |
| 2009/0242351 A1 | 10/2009 | Youngwerth, Jr. et al. | | |

* cited by examiner

*Primary Examiner*—Rodney H Bonck
(74) *Attorney, Agent, or Firm*—Clause Eight IPS; Michael Catania

(57) ABSTRACT

A hydraulic clutch for utilization with an engine of a motorcycle is disclosed herein. The hydraulic clutch includes a hydraulic clutch adjuster assembly, a clutch basket, a cover plate, first clutch plates, second clutch plates and a dynamic expansion ring assembly having cam members. The dynamic expansion ring assembly imparts substantially equal expansion forces in opposite directions. A gap is present when the engine is at an idle speed and cam members are positioned radially inward, and the gap is not present when the engine is operating faster than idle and the cam members are positioned radially outward by centrifugal force.

1 Claim, 27 Drawing Sheets

HYDRAULIC CLUTCH WITH EXPANSION RING ASSEMBLY

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic clutches for motorcycles, and a method and apparatus for modifying a hydraulic clutch for a motorcycle.

2. Description of the Related Art

A typical motorcycle clutch includes a clutch basket, a hub, a cover and clutch plates. A typical motorcycle has two types of plates, a steel plate and a fiber plate (the fiber plate is usually constructed of an aluminum substrate with a fiber material the substrate). A typical motorcycle clutch has eight fiber plates and seven steel plates structured in an alternating manner with a steel plate positioned between each of the fiber plates. The fiber plates typically have twelve tabs that are positioned between fingers of a clutch basket which allow the fiber plates to move with the clutch basket. Each of the steel plates has interior teeth that fit into a spline of an aluminum hub allowing the steel plates to move with the aluminum hub. Each of the steel plates preferably has a thickness of approximately 1.5 millimeters ("mm") and each of the fiber plates typically has a thickness of 3 mm. The steel plates are 1.5 mm thick because the teeth are forced against the aluminum hub, which can groove quite easily due to the massive amount of force. The exception to this general rule is a KTM rfs motor (no longer in production) which used 1 mm steel plates because the steel plates ran against a steel hub.

The clutch basket is connected to a crankshaft, and the hub is connected to the transmission. The only connection between the engine and gear box is the friction caused by the engagement of the fiber plates against the steel plates, and the engagement comes from the force exerted by multiple coil springs. The coil springs hold the engine and transmission together at all times except when the clutch lever is pulled by a rider. When the clutch lever is pulled, a slave is actuated which compresses the coil springs thereby creating gaps between the fiber plates and steel plates so that there is no longer any friction between them. When the clutch lever is pulled, the engine and transmission are two completely separate entities. Usually the coil springs clamp at around 200-300 pounds per square inch, which is more than enough to prevent the clutch from slipping. The clamping of coil spring feels positive on the rider's hand, and if there is a shock load to the transmission the clutch slips rather than breaking gears, sprockets or chains. For example, a shock load could come from a miscalculated jump.

Motorcycle clutches require the generation of sufficient centrifugal force to clamp the clutch plates together without substantial slippage and without utilizing a larger sized case which exceeds the space allowances available in most motorcycles. In the past, a pressure control mechanism was devised which combines the features of an automatic clutch with the performance of a traditional manual clutch so that the clutch engages smoothly without the use of a clutch lever at low speeds but limits the actual force transmitted to the clutch plates by the cam members at higher speeds. At the same time, the pressure control mechanism cooperates with a manual override lever to minimize the hand pressure required to override the cam members and effectively operate as a conventional manual clutch with relatively light feel or manual pressure and yet be capable of operating within the same space limitations as the standard or stock motorcycle clutches. Further, with hydraulic actuated clutches, there is no way of adjusting the hydraulic fluid in order to act on a clutch pack.

The prior art discloses various clutch mechanisms for motorcycles. One example is Youngwerth, Jr. et al., U.S. Patent Publication Number 2009/0242351, for an Automatic Clutch employing Expanding Friction Disk And An Adjustable Pressure Plate, which discloses an expanding friction disk assembly that expands under centrifugal force to provide automatic engagement of the clutch.

Yet another example is Maimone, U.S. Pat. No. 6,533,056 for a Motorcycle Automatic Clutch With Manual Release which discloses the use of a release plate which is movable between a first and second position to manually disengage the clutch.

Yet another example is Youngwerth, U.S. Pat. No. 6,957,730 for a Clutch Apparatus With An Automatic Centrifugal Engagement Of Pressure Plate which discloses a centrifugal pressure plate that moves axially which causes the plates to couple thereby forcing engagement between the engine and the transmission.

A motorcycle with a hydraulic clutch is disclosed in Ogasawara et al, U.S. Patent Publication Number 2008/0264754 for a Hydraulic Clutch Device, which is directed at a hydraulic clutch device with reduced axial size by arranging a large portion of the clutch disengage/engage control mechanism radially inward of a clutch actuation mechanism.

There is still a need for a mechanism to easily modify a hydraulic motorcycle clutch into a centrifugal clutch.

BRIEF SUMMARY OF THE INVENTION

The present invention is a novel improvement upon the clutch features discussed in U.S. Pat. Nos. 6,705,446, 6,814,208, 7,014,026 and 7,140,480, which have been assigned to the assignee of the present application and which are all herein incorporated by reference in their entireties. The present invention provides a modification for a hydraulic clutch to be converted into a centrifugal clutch.

The main features of the present invention are a dynamic expansion ring assembly and a hydraulic clutch adjuster. The dynamic expansion ring assembly preferably fits within a stock motorcycle clutch allowing the stock manufacturer manual clutch to be converted into a centrifugal clutch. In a preferred embodiment, the dynamic expansion ring assembly is substituted for a fiber clutch plate. The dynamic expansion ring assembly can be considered a fiber plate since fiber material is bonded on both sides of the dynamic expansion ring assembly. In an alternative embodiment, one additional fiber plate is removed from a stock manufacturer hydraulic clutch, however, the surface area of the fiber on the dynamic expansion ring assembly is on average that of 1.5 fiber plates. Since the steel plate and fiber plates alternate, losing one fiber plate means losing one steel plate. In this embodiment, the steel plates are machined on one side to the size of the inside diameter of the fiber to create additional space for the dynamic expansion ring assembly. The steel plates are machined down to 1 mm only where the steel plate engages with a fiber plate so as to not change the cross-sectional area of the interior teeth of the steel plate that engage the aluminum hub.

The dynamic expansion ring assembly contains ball bearings encompassed in multiple ramps. Six springs holding the two pieces of the dynamic expansion ring assembly together and these springs change the speed at which the engine has to spin before the dynamic expansion ring assembly opens.

The present invention allows a change from neutral to gear without using a clutch lever and never stalling because there is a gap within the clutch pack (similar to when a rider pulls a clutch lever on a stock clutch). The gap is created by adjusting hydraulic fluid of a hydraulic actuated clutch. A slave cylinder preloads the clutch springs, and the size of the gap is controlled by an adjuster assembly on a handlebar of the motorcycle which allows a rider to twist a cap to increase or decrease the size of the gap. As soon as the engine increases speed above idle, the dynamic expansion ring assembly expands and closes the gap (in order for the dynamic expansion ring assembly to open, the force of the ball bearings must overcome the force of the springs of the dynamic expansion ring assembly. The number of springs is 2, 3, 4 or 6). The faster the engine rotates, the greater the force applied to the clutch pack. The maximum possible force that could be applied to the clutch pack is that of the stock coil springs (approximately 200-300 pounds per square inch ("psi")). The gap that is required is approximately 0.025 inch. The dynamic expansion ring assembly can open up to 0.100 inch so after the gap closes there is approximately 0.075 inch available (the extended opening of the dynamic expansion ring assembly allows for wear) which would only open up if the force was 200 psi, which only occurs at high rotations per minute ("RPM").

The hydraulic clutch adjuster assembly can open the gap at any engine speed similar to a stock clutch. With the adjuster assembly, a reservoir cap on a master cylinder is used to adjust the size of the gap. The adjustment of the gap is performed by loosening the cap to decrease the size of the gap or tightening the cap to increase the size of the gap. Completely decreasing the size of the gap allows a rider to bump start the bike.

In a preferred embodiment, the present invention is a hydraulic clutch with a dynamic expansion ring assembly specifically adapted for motorcycles and which is preferably composed of a minimum number of parts which can be retrofit into most standard centrifugal clutches which employ annular clutch plates, commonly referred to as a "clutch pack". The clutch pack is modified to incorporate a dynamic expansion ring assembly at an intermediate location between the clutch plates, as opposed to being mounted at one end. Among other features is the ability to employ the dynamic expansion ring assembly in place of one or more of the standard clutch plates without increasing the total space occupied by the clutch pack, and eliminating a separate pressure plate within the cover at one end of the clutch pack while achieving increased stability and control in engaging and disengaging the multiple clutch plates in the clutch pack.

One aspect of the present invention is a hydraulic clutch assembly for utilization with an engine of a motorcycle. The hydraulic clutch assembly includes a master cylinder, an adjuster component, a slave cylinder, a hydraulic fluid line, a clutch basket, a cover plate, a hub, first clutch plates, second clutch plates and a dynamic expansion ring assembly. The master cylinder has a reservoir of fluid and is mounted on a handle bar of a motorcycle. An adjuster component is attached to the master cylinder. The adjuster component comprises a body, a piston and a cap. The body comprises a base section engaging the master cylinder and a cylinder section extending from the base section and having an aperture. The aperture is in flow communication with the reservoir of fluid. The piston is disposed within the aperture of the cylinder section. The cap is threadingly connected to the cylinder section. A slave component is in flow communication with the reservoir of fluid through the fluid line. The clutch basket includes a base plate with periphery walls spaced apart by teeth engaging slots. The cover plate is mounted on the clutch basket. The cover plate has an undermost portion. The hub has a cylindrical wall with radial slots. The hub extends through a center of the clutch basket. Each of the first clutch plates is positioned within the clutch basket. Each of the first clutch plates has teeth for engaging with a corresponding teeth engaging slot of the teeth engaging slots of the clutch basket. Each of the first clutch plates comprises a non-metal material. Each of the second clutch plates is positioned within the clutch basket. Each of the second clutch plates has radially inwardly extending teeth. Each of the radially inwardly extending teeth engage with a corresponding radial slot of the slots of the cylindrical wall of the hub. Each of the second clutch plates is composed of a metal material. The dynamic expansion ring assembly is positioned substantially in a middle of the clutch basket. The dynamic expansion ring comprises a first cam ring portion, a second cam ring portion and cam members held between the first cam ring portion and the second cam ring portion. The first cam ring portion comprises cam receiving portions, external teeth and cam faces. The second ring portion comprises indented cam faces. Each of the external teeth engage with a corresponding teeth engaging slot of the teeth engaging slots of the clutch basket. The cam members are capable of moving inward and outward in the each of the cam receiving portions. The dynamic expansion ring assembly imparts substantially equal expansion forces in opposite directions away from the dynamic expansion ring assembly and against the first clutch plates and the second clutch plates to urge them into clutching engagement. A gap is present between the cover plate and an end plate of the plurality of first clutch plates when the engine is at an idle speed and each of the cam members is positioned radially inward in the dynamic expansion ring assembly. The gap is not present when the engine is operating faster than idle and each of the cam members is positioned radially outward in the dynamic expansion ring assembly by centrifugal force. The gap is adjustable by tightening the cap to increase the size of the gap and loosening the cap to decrease the size of the gap.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
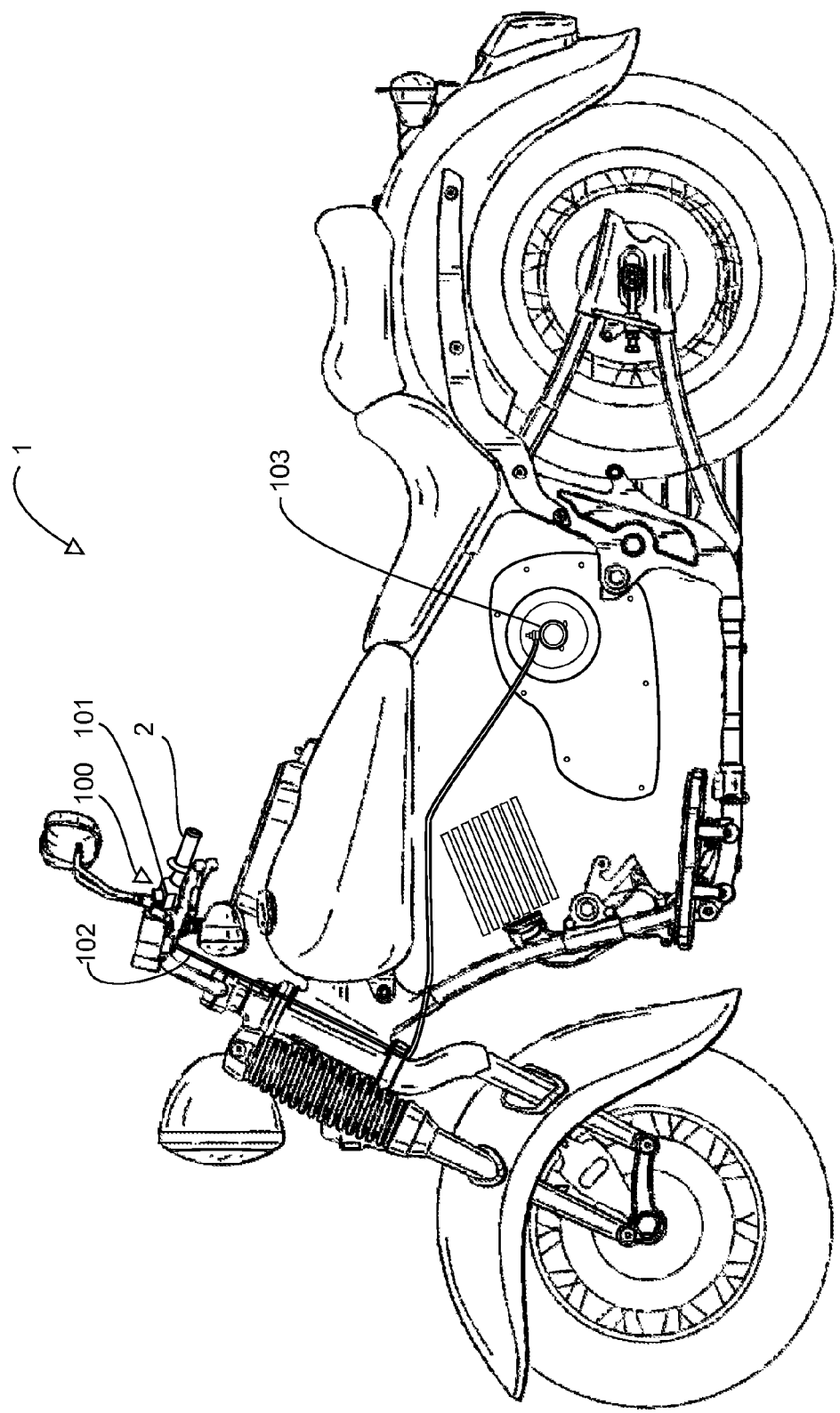
FIG. 1 is a side view of a motorcycle with a hydraulic clutch.
Figure 1A:
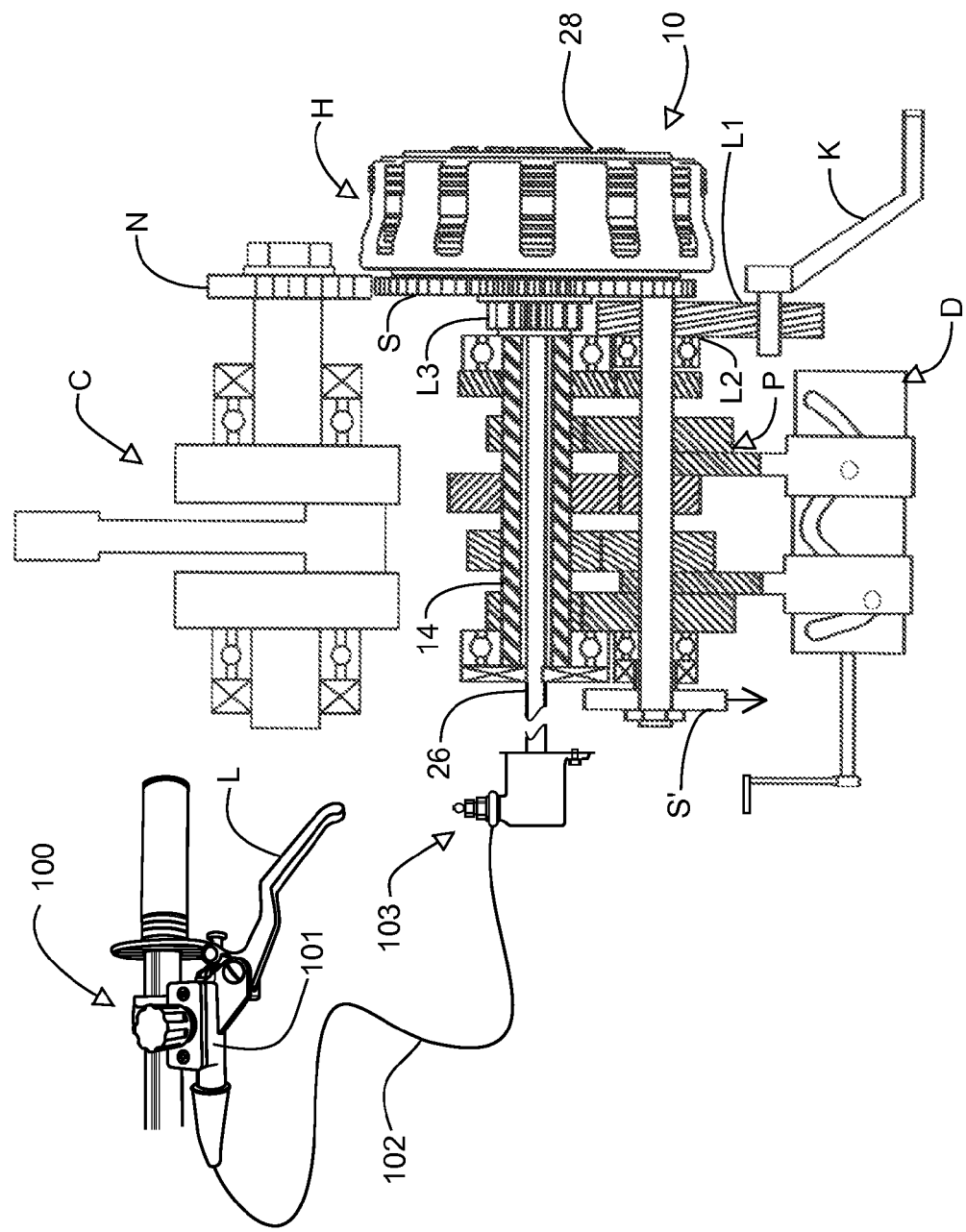
FIG. 1A is a view partially in section of one embodiment of a clutch mechanism and schematically illustrating a shift drum for regulating the gear ratio between a transmission shaft and motorcycle, kickstart lever, clutch lever, crankshaft driven off of an engine, and gear drive.
Figure 1B:
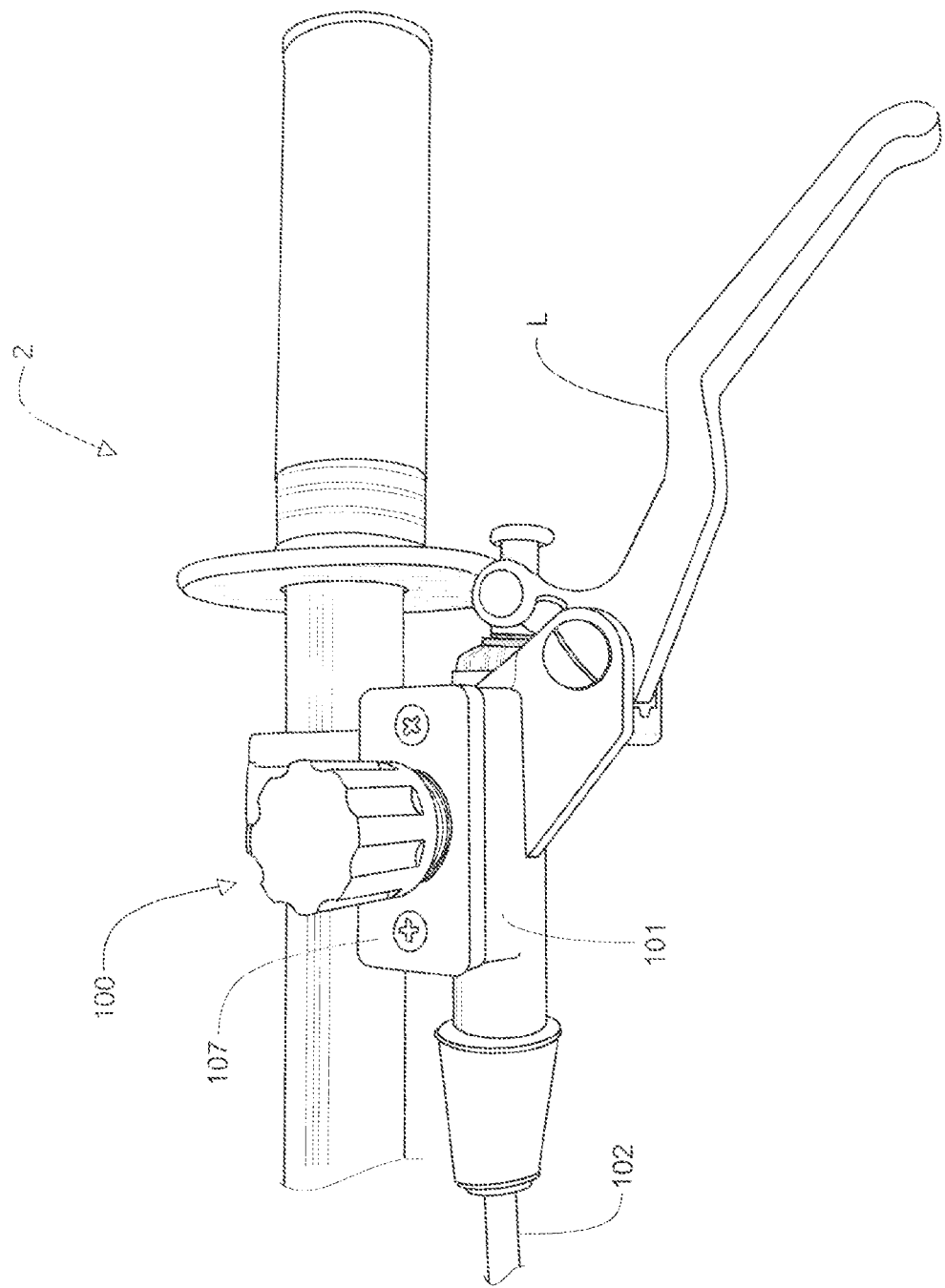
FIG. 1B is an isolated view of a handlebar of a motorcycle with a hydraulic clutch assembly attached thereto.
Figure 1C:
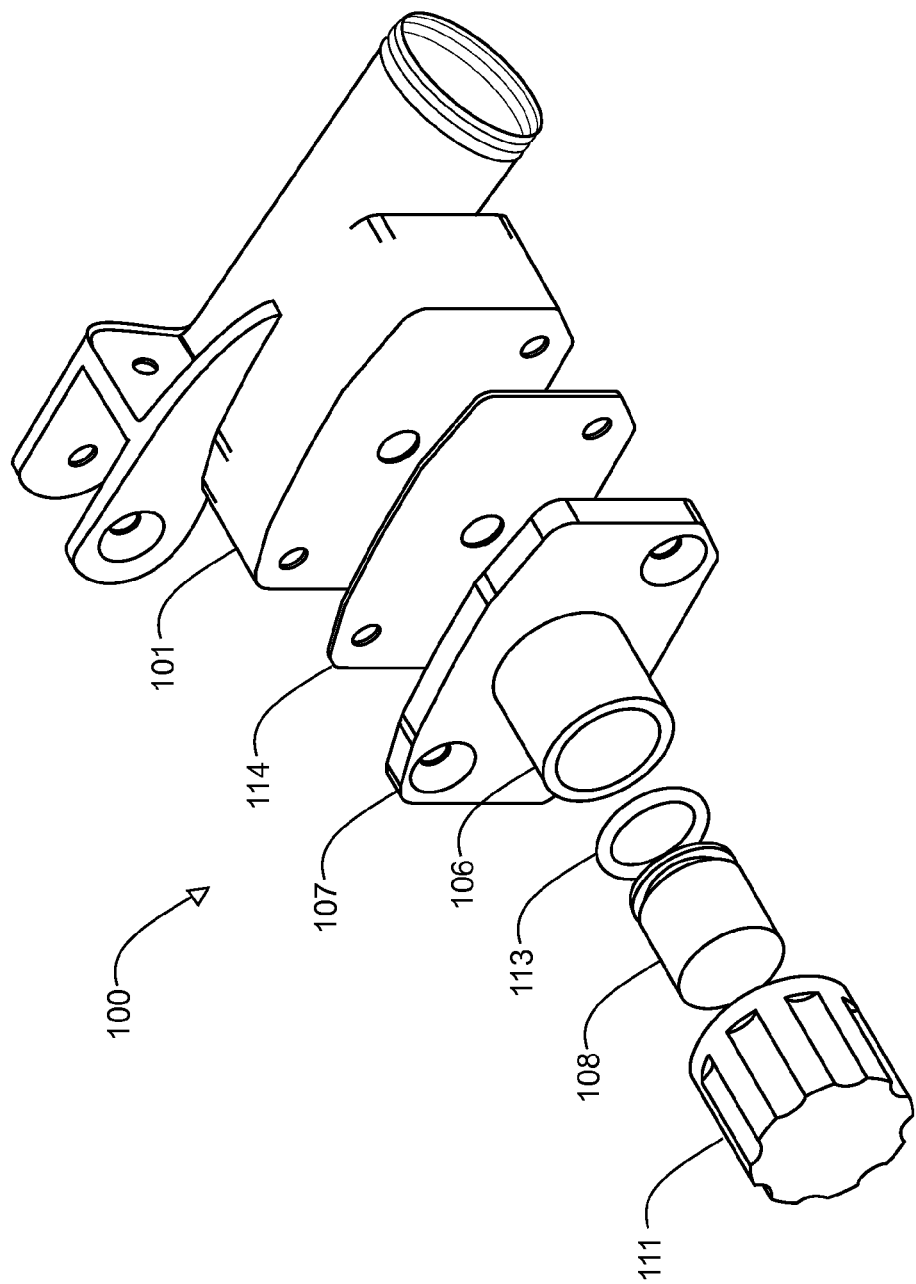
FIG. 1C is an exploded view of a hydraulic clutch assembly.
Figure 2:
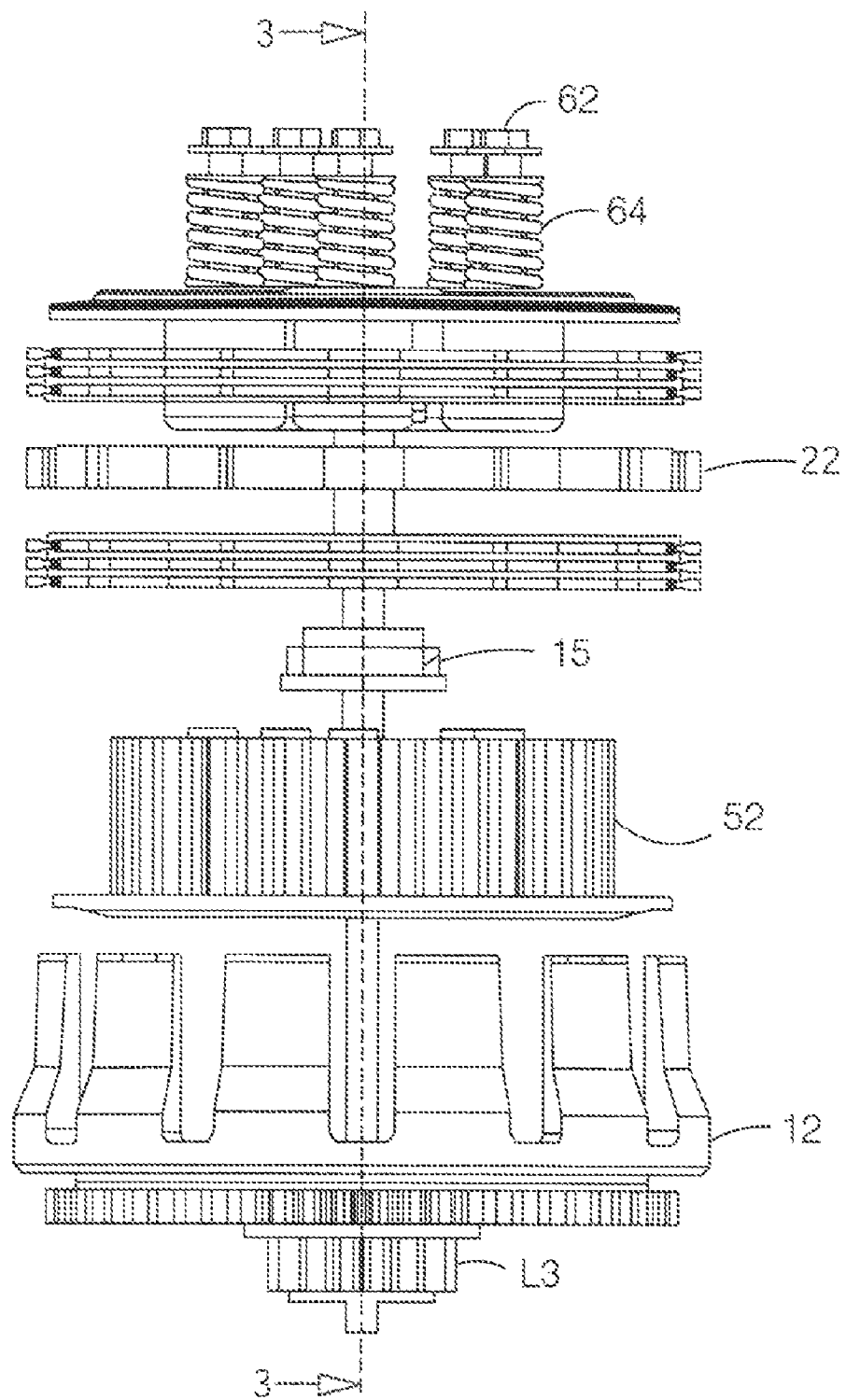
FIG. 2 is an exploded view of the clutch housing illustrated in FIG. 1.
Figure 3:
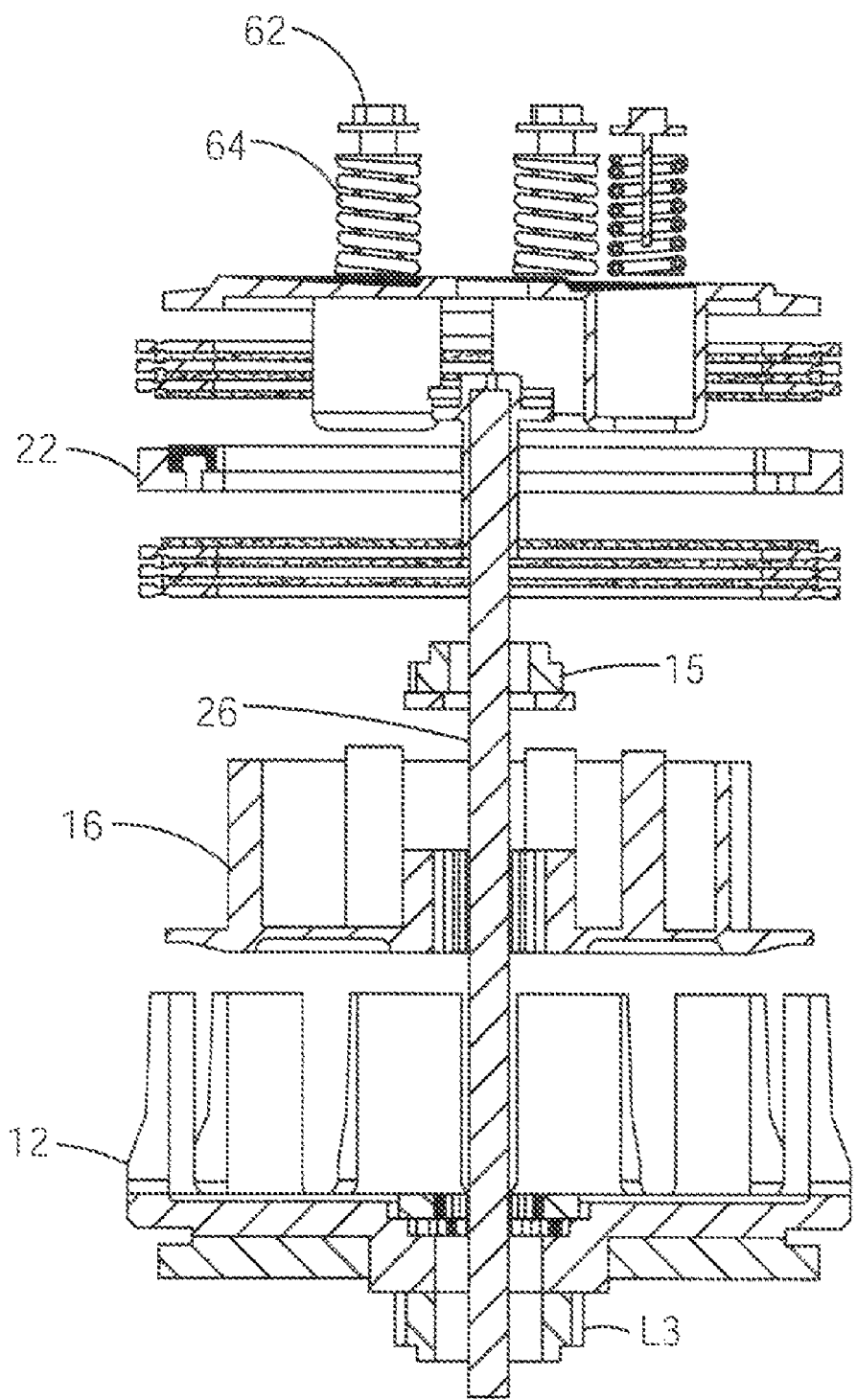
FIG. 3 is a sectional view taken about lines 3-3 of FIG. 2.

As shown in FIGS. 1, 1A and 1B, a motorcycle 1 has a hydraulic clutch adjuster assembly 100 located on a handlebar 2. The hydraulic clutch adjuster assembly 100 is mounted on a master cylinder 101 which is in fluid communication with a slave cylinder 103 through a hydraulic fluid line 102. As shown in FIG. 1C, the hydraulic adjuster assembly 100 preferably comprises a body having a base section 107 and a cylindrical section 106 extending from the base section 107. A piston 108 is placed within an aperture of the cylindrical section 106 and a reservoir cap 111 is threadingly engaged to the cylindrical section 106. A gasket 113 is optionally utilized with the piston 108. Further a gasket 114 is preferably placed between the base section 107 and the master cylinder 101. The aperture of the cylindrical section 106 is in fluid communication with a reservoir of fluid within the master cylinder 101, which is in fluid communication with the fluid line 102, which is in fluid communication with the slave cylinder 103. The slave cylinder 103 actuates a control rod 26 to press against a bearing 65 to act on a cover 28 to increase or decrease the size of the gap. A rider can control the size of the gap by tightening the cap 111, which pressures the piston to pressure the hydraulic fluid to increase the size of the gap through pressure on the cover plate 28. The rider can also decrease the size of the gap by loosening the cap 111 which relieves pressure on the piston 108, which relieves pressure on the cover 28 thereby decreasing the size of the gap.

In a preferred embodiment, the hydraulic actuated clutch is utilized to preload the gap G of the clutch 10. The hydraulic actuated clutch comprises the master cylinder 101 that has a body substituted for a stock reservoir cap. The body is bolted to the master cylinder 101 of the hydraulic system. A base section 107 of the body is attached to the master cylinder 101 with a cylindrical section 106 extending upward from the base section 107. The piston 108 is positioned within the aperture of the cylindrical section 106 of the body. When the piston 108 is pushed downward within the aperture, fluid is forced through a hydraulic fluid line 102 of the hydraulic system thereby creating a gap G in clutch 10. The cap 111 is placed over the cylindrical section 106 of the body. The cap 111 preferably threadingly engages the cylindrical section 106 of the body. The tightening and loosening of the cap 111 on the cylindrical section 106 adjusts the gap G in the clutch 10. Tightening the cap 111 increases the size of the gap G, and loosening the cap 111 reduces the size of the gap G. With the hydraulic adjuster arrangement, the gap G is controlled from a zero gap size to an installed gap G size. At a zero gap it is possible to bump start the motorcycle whereas the installed gap G operates as an automatic clutch.

A preferred embodiment of a centrifugal clutch is shown in FIGS. 1A to 19 in which a clutch 10 is specifically adaptable for use in a motorcycle, not shown. As specifically shown in FIG. 1, a crankshaft C is driven by an engine, not shown, to impart rotation to a power input side of the clutch 10 via a gear drive N or other standard drive means. The gear drive N imparts rotation to a first sprocket S at one end of a clutch housing H which is broadly made up of outer walls and base of a clutch basket 12 and a cover plate 28 to be hereinafter described in more detail. A transmission shaft 14 is secured at one end by a nut 15 within the clutch housing H and is rotated by a hub 16 within the clutch housing H when the first plurality of clutch plates 18 and the second plurality of clutch plates 20 are engaged by a dynamic expansion ring assembly 22; and through speed reduction gearing P, are operative to rotate the standard drive means, not shown, off of an output sprocket S' to the rear wheel of the motorcycle. A shift drum D controls the gear ratio of the gearing P, and a kickstart lever K operates in a well-known manner through gears L1, L2 and L3 through the crankshaft C to start the engine.

Figure 4:
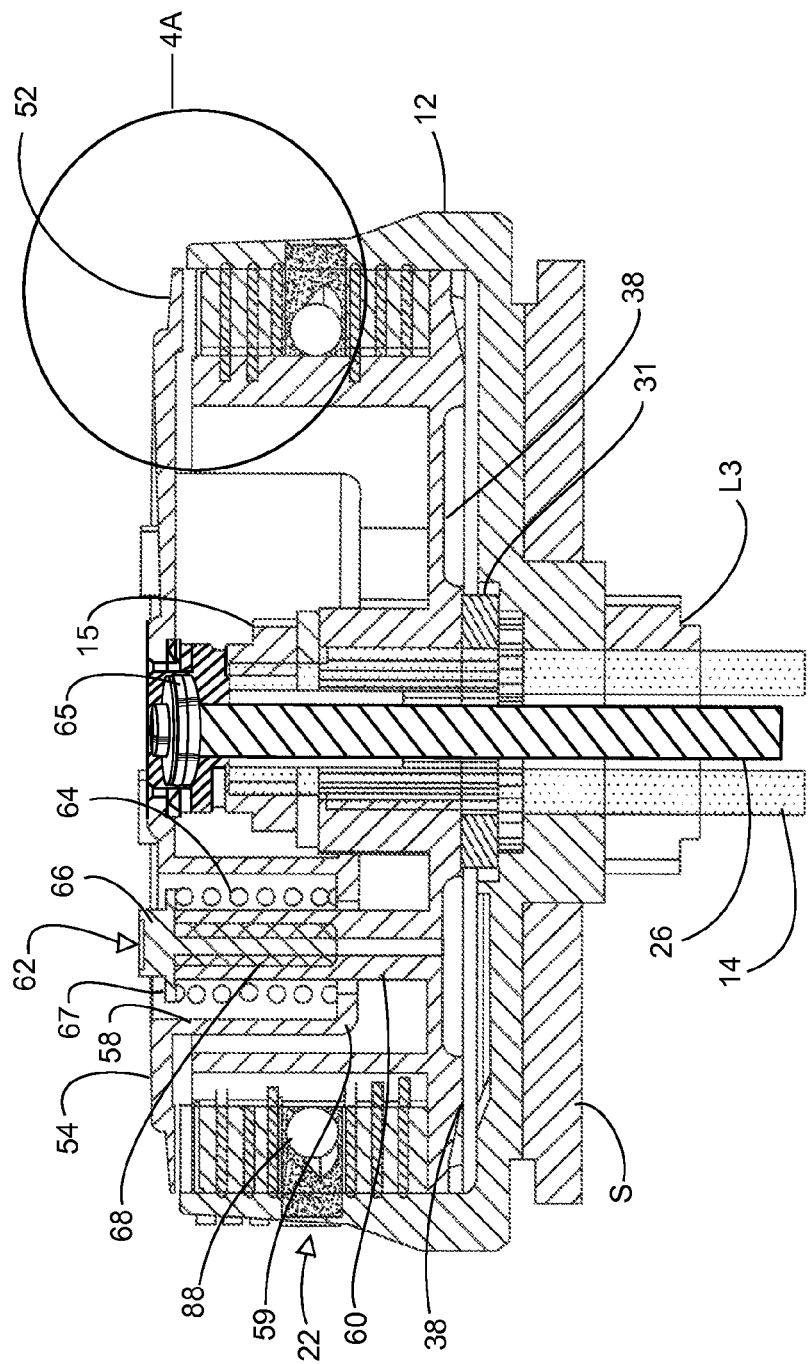
FIG. 4 is another sectional view of the clutch housing with the engine at idle speed.
Figure 4A:
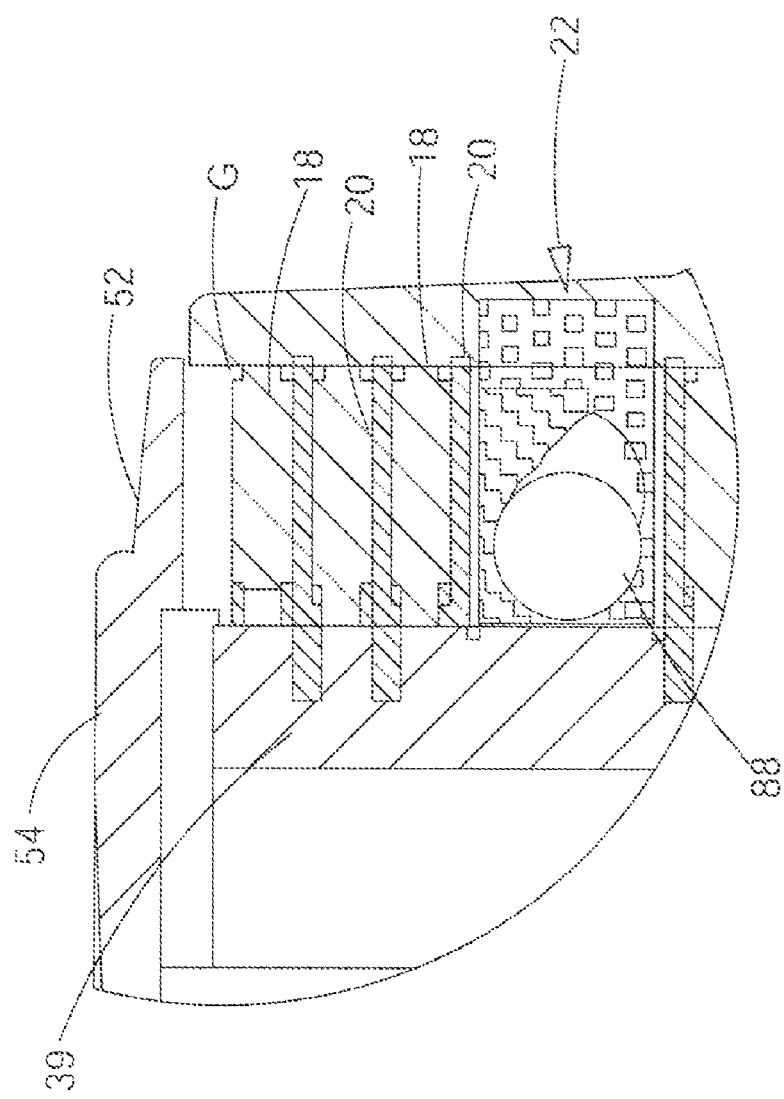
FIG. 4A is a detailed view taken at 4A of FIG. 4 and illustrating in more detail a gap present at idle speed.
Figure 4B:
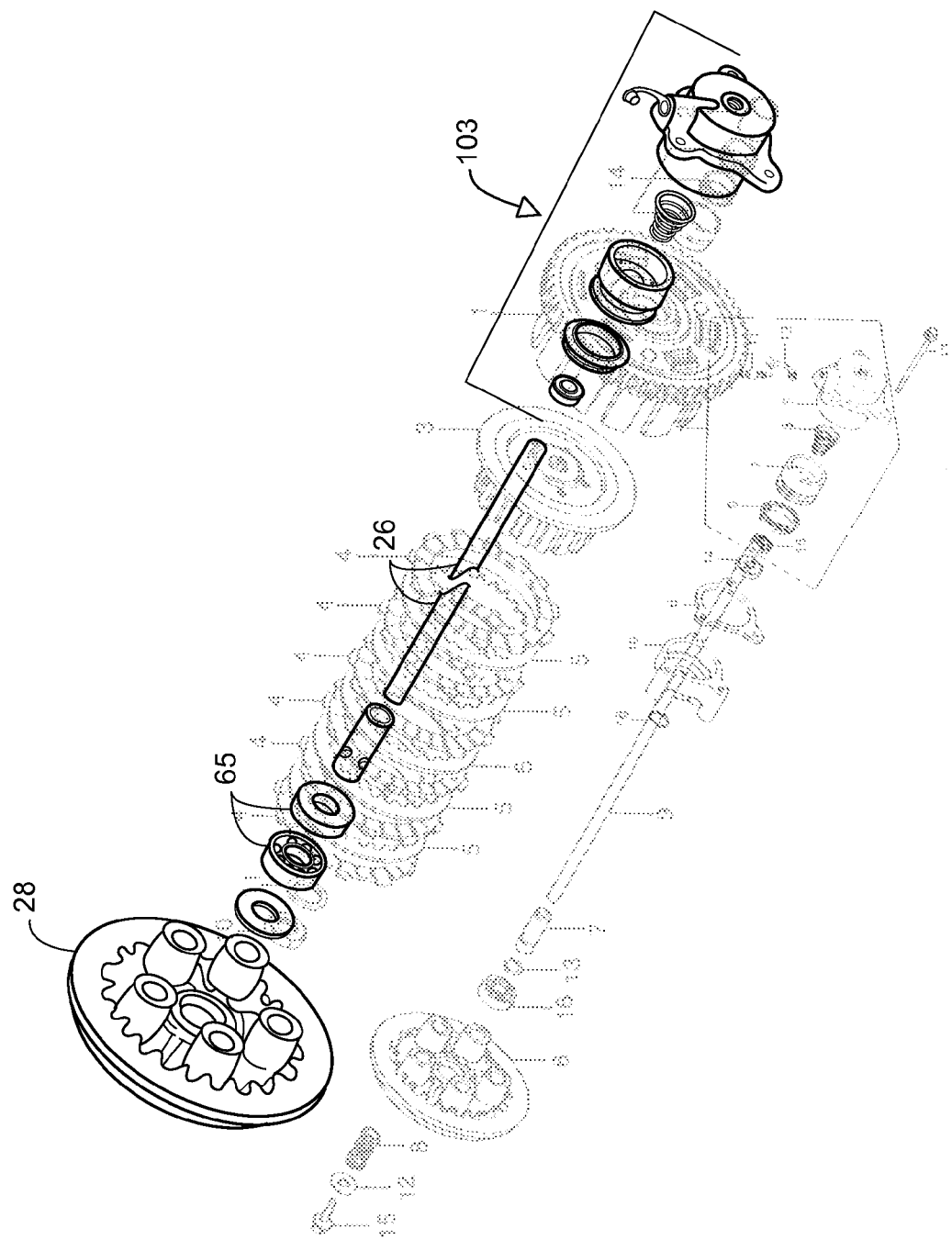
FIG. 4B is an exploded view of components that are involved in adjusting the size of the gap.

The control rod 26 extends into the clutch housing H in spaced inner concentric relation to the hollow transmission shaft 14 and is controlled by the slave cylinder 103 and the lever mounted on the handlebar 2 of the motorcycle 1 and which operates through the slave cylinder 103 to force the cover plate 28 axially to form the gap G between the cover plate 28 and an end plate of the first clutch plates 18 as shown in FIGS. 4, 4A and 4B. When the clutch lever L is squeezed by the operator, the control rod 26 acts through the clutch plate lifter to lift the cover plate 28 for a distance greater than the dynamic expansion ring assembly 22 is capable of expanding and the gap G is thereby created to disengage the drive irrespective of the speed of the motorcycle.

As shown in more detail in FIGS. 2 to 8, the clutch basket 12 includes an annular base plate 30 with upstanding circumferentially spaced periphery walls 32 which are spaced apart to define teeth-engaging slots 33 at uniformly spaced intervals. The periphery walls 32 are affixed to and extend upwardly from the outer periphery of the base plate 30, and inturned ledges 34 are located at the free ends of each of the periphery walls 32. The clutch basket 12 is preferably of standard construction and one example is a model manufactured by Kawasaki (Part No. 13095-0052). A hub 16 is mounted within the hollow interior of the clutch housing H and includes a hollow cylindrical portion 37 extending upwardly from an annular base plate 38 with a thrust bearing 31 interposed between the base plate 30 and the lower end of the cylindrical portion 37. A base plate 38 is disposed in adjacent spaced relation to and above the base plate 30 and terminates in an outer circular wall 39 in inner spaced concentric relation to the spaced walls 32 of the clutch basket 12.

The plurality of first clutch plates 18 alternate in position with the plurality of second clutch plates 20 within the clutch basket 12. Each of the plurality of first clutch plates 18 are keyed to the periphery walls 32 of the clutch basket 12 by radially outwardly extending teeth 42 to inter-engage with the teeth-engaging slots 33. Each of the plurality of second clutch plates 20 are keyed to the outer cylindrical portion 37 of the hub 16 by radially inwardly extending teeth 44 which inter-fit with radial slots in the cylindrical wall 37 of the hub 16. Each of the plurality of second clutch plates 20 is preferably composed of a relatively hard metal such as steel. Each of the plurality of first clutch plates 18 is preferably composed of a metal such as aluminum, and each has a plurality of circumferentially spaced, generally rectangular fibrous friction pads R. Each rectangular fibrous friction pads R extend radially for the substantial extent of one of the opposed flat surfaces of each of the second clutch plates 20. However, the opposite surface of each of the plurality of second clutch plates 20 is flat and has a flush engagement with an annular surface portion of a corresponding plurality of first clutch plate 18.

Figure 7:
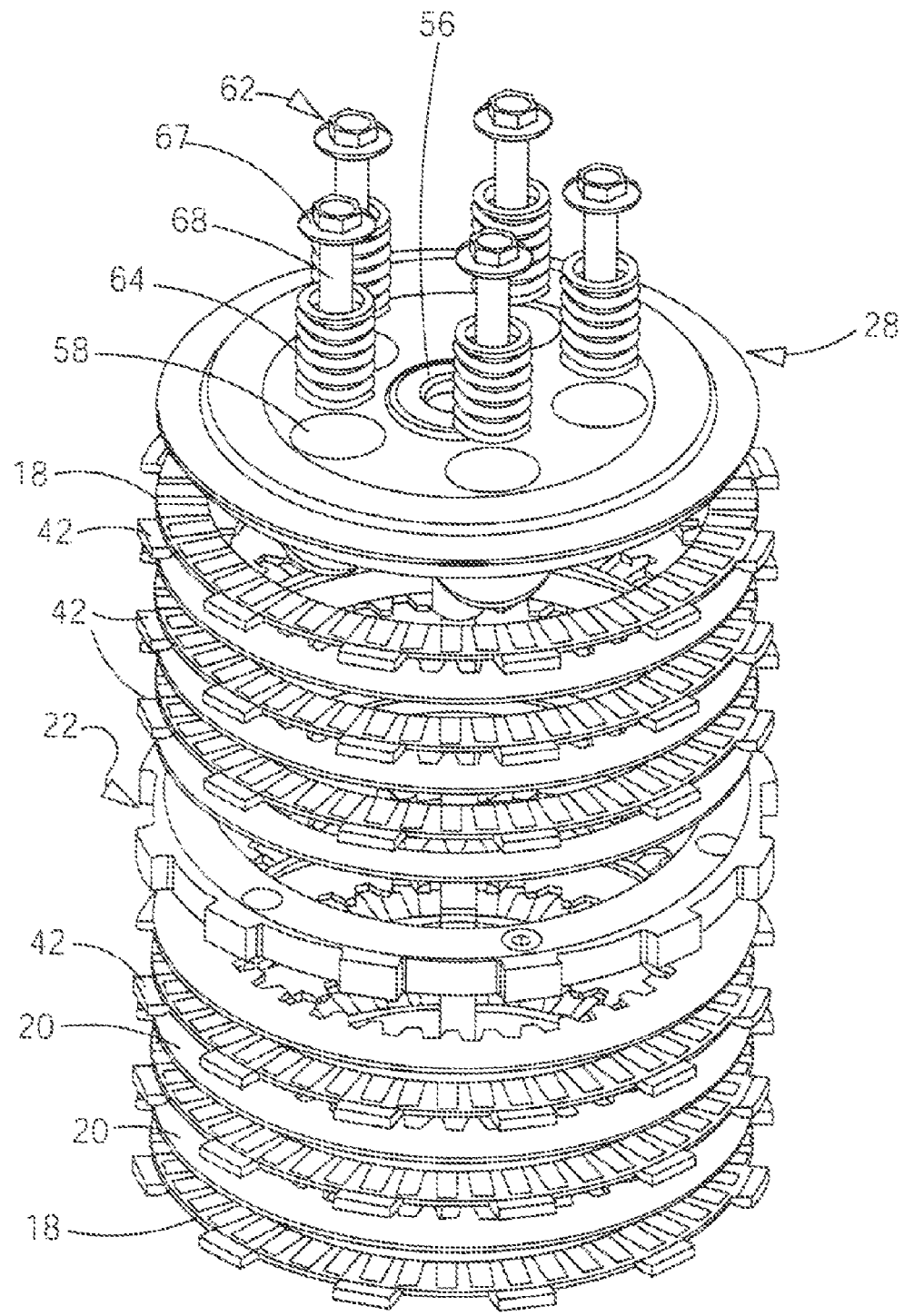
FIG. 7 is an exploded view of the clutch plates and dynamic ring assembly as well as spring-loaded cover plate of the one embodiment.

In one embodiment, the dynamic expansion ring assembly 22 is utilized to convert a standard motorcycle manual clutch into a centrifugal clutch. Each of a plurality of first clutch plates 18 comprise fiber and each of a plurality of second clutch plates 20 comprise steel. Preferably, there are eight first clutch plates 18 and seven second clutch plates 20. The plurality of first clutch plates 18 ride in the clutch basket 12 with circumferentially spaced tabs 42 that fit between the fingers of the clutch basket 12. The plurality of second clutch plates 20 ride upon an aluminum hub 16 and each of the plurality of second clutch plates 20 has teeth that fit in a spline of the aluminum hub 16. The first clutch plates 18 and the second clutch plates 20 alternate with a second clutch plate 20 positioned between first clutch plates 18. Typically, each of the plurality of second clutch plates 20 has a thickness of approximately 1.5 mm and each of the plurality of first clutch plates 18 has a thickness of approximately 3 mm. The dynamic expansion ring assembly 22 is preferably positioned in a center position of the clutch basket 12, typically substituting for a first clutch plate 18 when a standard clutch is converted into a centrifugal clutch. For example, as shown in FIG. 7, a preferred structure has a first clutch plate 18, a second clutch plate 20, a first clutch plate 18, a second clutch plate 20, a first clutch plate 18, a second clutch plate 20, the dynamic expansion ring assembly 22, a second clutch plate 20, a first clutch plate 18, a second clutch plate 20, a first clutch plate 18, a second clutch plate 20 and a first clutch plate 18. In this preferred structure, the dynamic expansion ring assembly 22 imparts substantially equal force against an equal number of first clutch plates 18 and second clutch plates 20 on each side of the dynamic expansion ring assembly 22.

Figure 5:
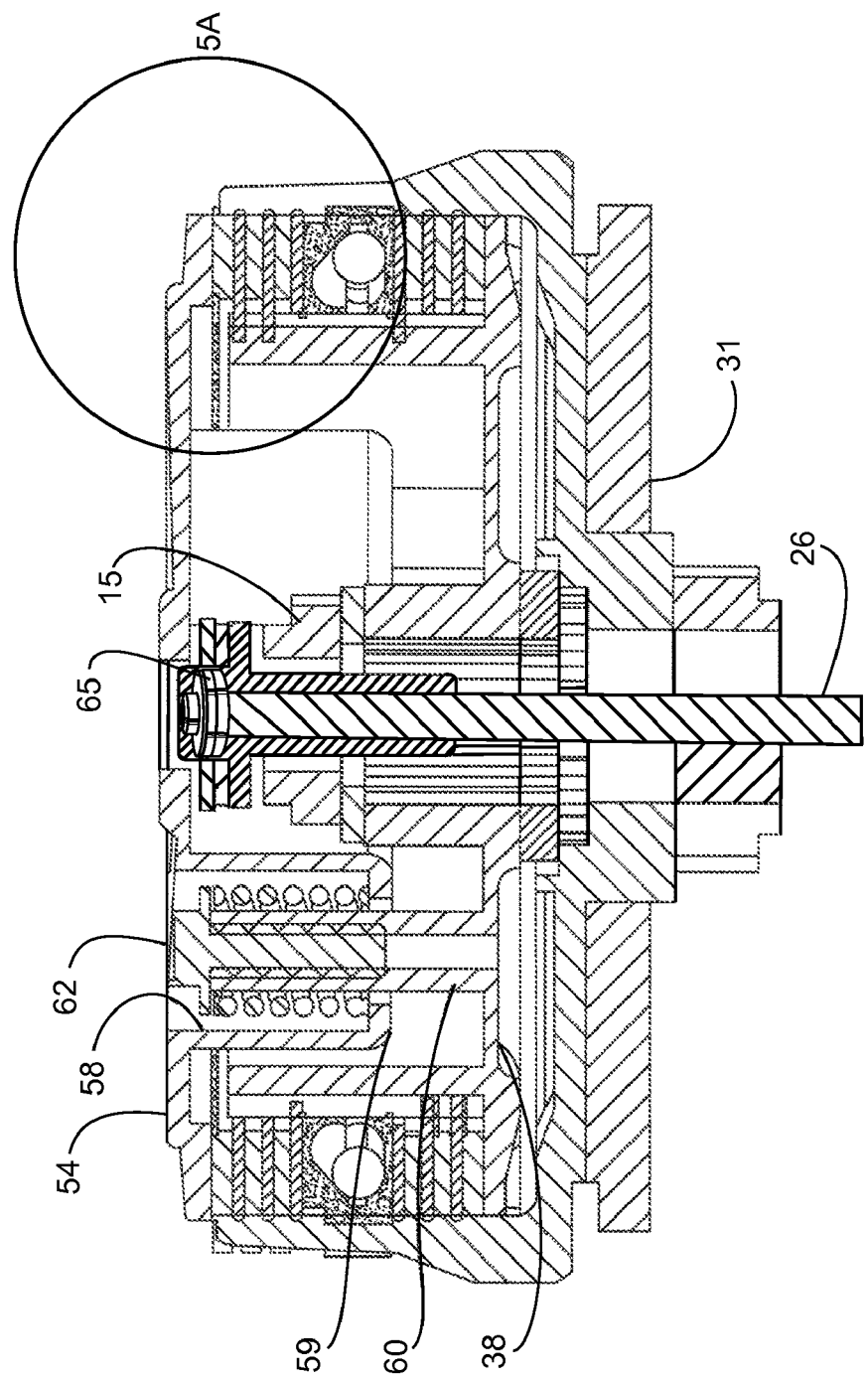
FIG. 5 is another cross-sectional view of the clutch housing showing the relationship between parts when a control rod is disengaged.
Figure 6:
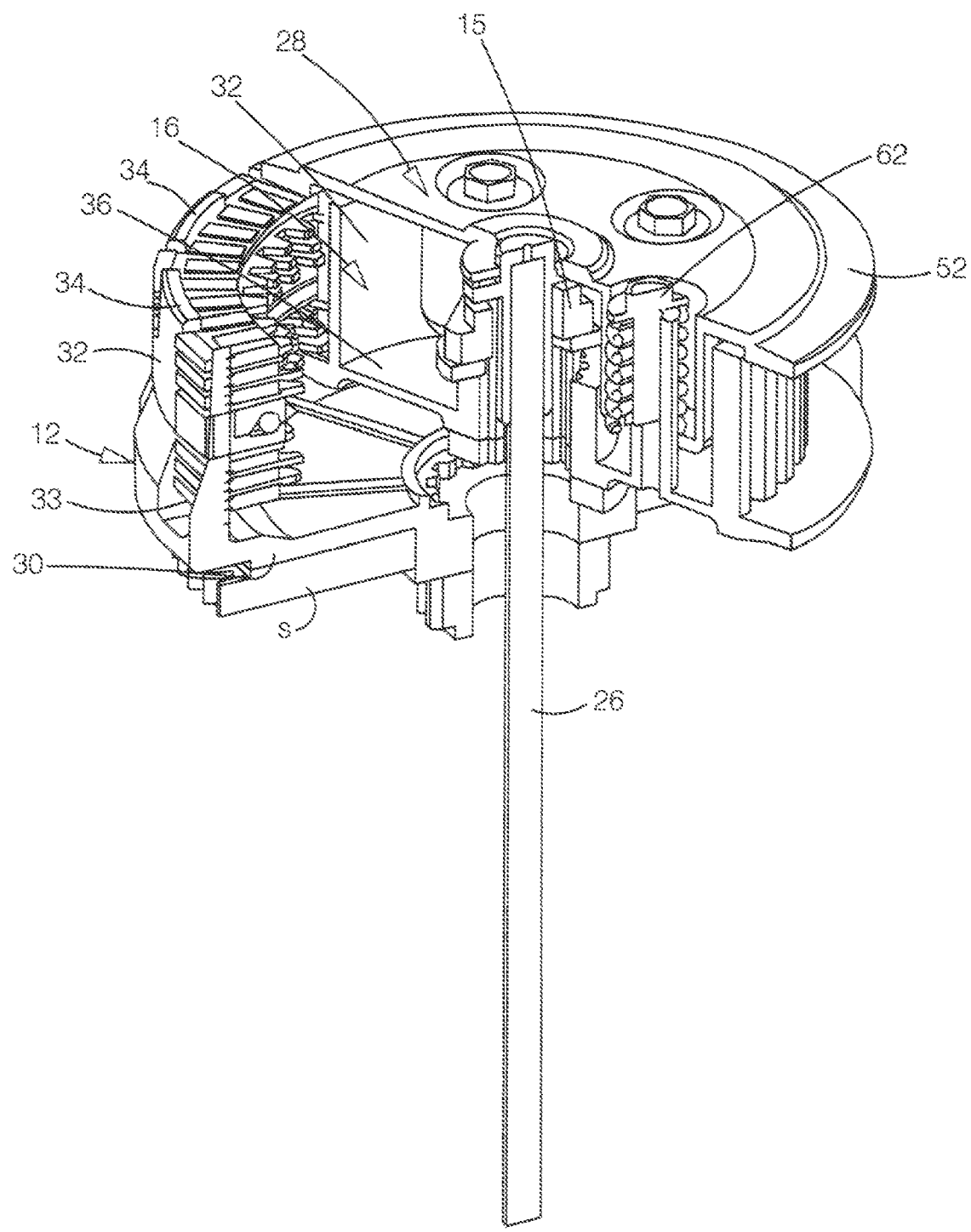
FIG. 6 is a cutaway, enlarged view of the clutch housing.

As shown in FIGS. 4, 5, 6 and 7, the cover plate 28 is mounted on the clutch basket 12 and has a radially outer wall portion 52 overlaying the first clutch plates 18 and the second clutch plates 20 between the periphery walls 32 of the clutch basket. The cover plate 28 also has a radially inner slightly raised solid circular wall portion 54 which is substantially flat and is provided with a central bore to receive a clutch lifter in the form of a cap-like extension of a sleeve member 56 to receive the end of the control rod 26. The cover plate 28 is preferably of unitary construction, and as shown in FIGS. 5 and 6, a series of circumferentially spaced sleeves 58 extend outwardly from the inner wall portion 54, with each sleeve 58 terminating at its inner end in a radially inwardly extending annular lip 59. A series of tubular posts 60 project upwardly from the base plate 38 of the hub 16, with each of the tubular posts 60 preferably adapted for insertion of a shoulder bolt 62 and outer surrounding compression spring member 64. Specifically, each bolt 62 has an enlarged head 66, a shoulder portion 67 and a reduced diameter threaded stem portion 68, the latter being threadedly connected into each tubular post 60 of the hub 16. In this way, the shoulder 67 bears against the spring 64 which is inserted between each sleeve 58 and tubular post 60 with the opposite end of each tubular post 60 bearing against an annular lip 59.

The compression springs 64 are mounted under compression concentrically between each shoulder 67 and lip 59 of each post 60 to control the gap G between the flat undersurface of the annular portion 54 of the cover plate 28 and the endmost friction pad-covered surface 51 of an end plate of the first clutch plates 18 in facing relation to the annular portion 52. Initially, the gap G is created by adjusting the clutch cable mechanism so that as the clutch cable is tightened, the control rod 26 forces the cap-like extension of the sleeve through the central bore. The sleeve member is provided with an external shoulder and bearing against the cover plate 28 to increase the gap G by overcoming the spring force of the compression spring 64. Gap adjustment is further discussed in greater detail in connection with the operation of the clutch.

The dynamic expansion ring assembly 22 is explained in detail in relation to FIGS. 7 to 10. The dynamic expansion ring assembly 22 is preferably positioned in the clutch basket 12 intermediately between the first clutch plates 18 and the second clutch plates 20.

The dynamic expansion ring assembly 22 preferably comprises a relatively thick first cam ring portion 82 of a generally L-shaped cross-sectional configuration defined by an outer peripheral circular band 83 and a first cam-receiving portion 85 extending radially inwardly from one edge of the outer peripheral circular band 83. The first cam ring portion 82 also preferably has indented, circumferentially spaced cam faces 84 on an inner surface 84' and a continuous friction pad layer F on an outer flat surface 85' of the portion 85, as further shown in FIGS. 12-16. The outer peripheral circular band 83 is disposed in surrounding relation to the cam faces 84 and is provided with radially outwardly projecting external teeth 86 which correspond to and are aligned with the external teeth 42 on the first clutch plates 18.

Figure 5A:
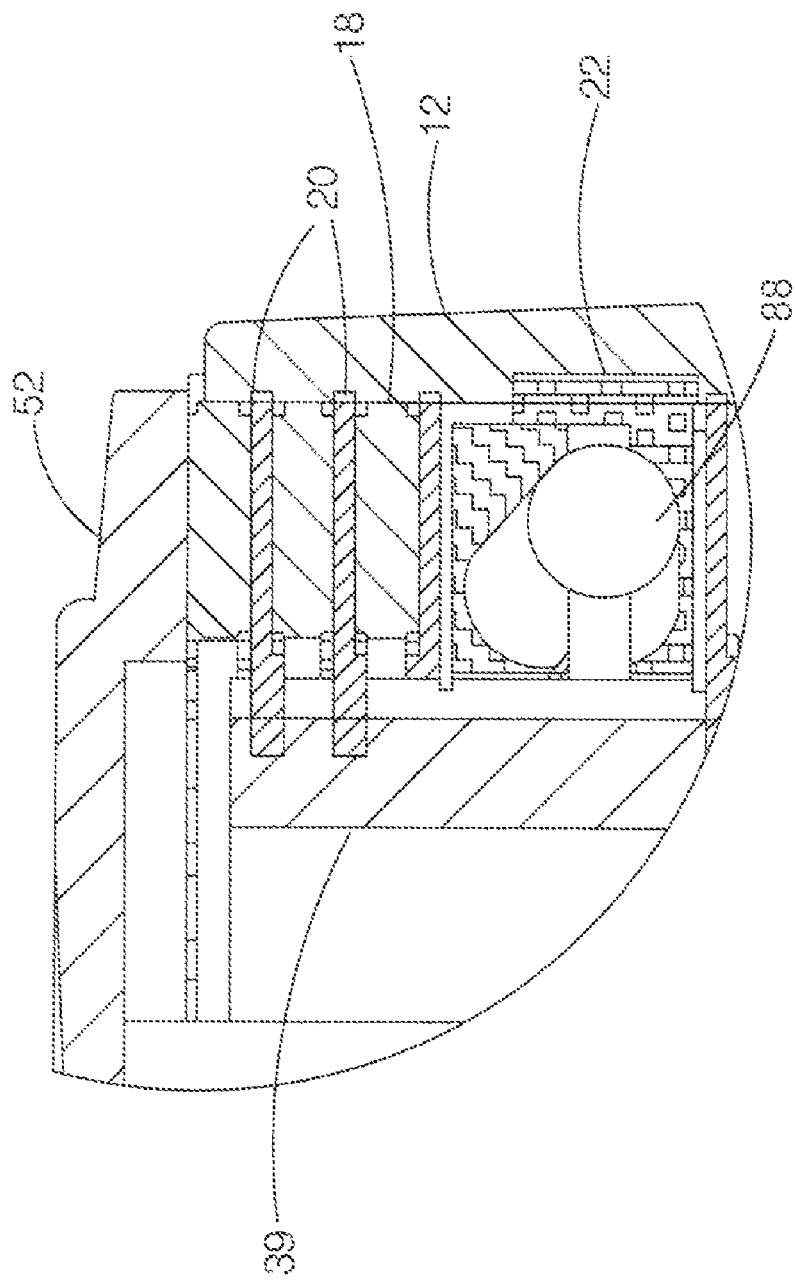
FIG. 5A is a detailed view taken at circle 5A of FIG. 5 and illustrating the relationship between parts when the engine is above idle speed.
Figure 8:
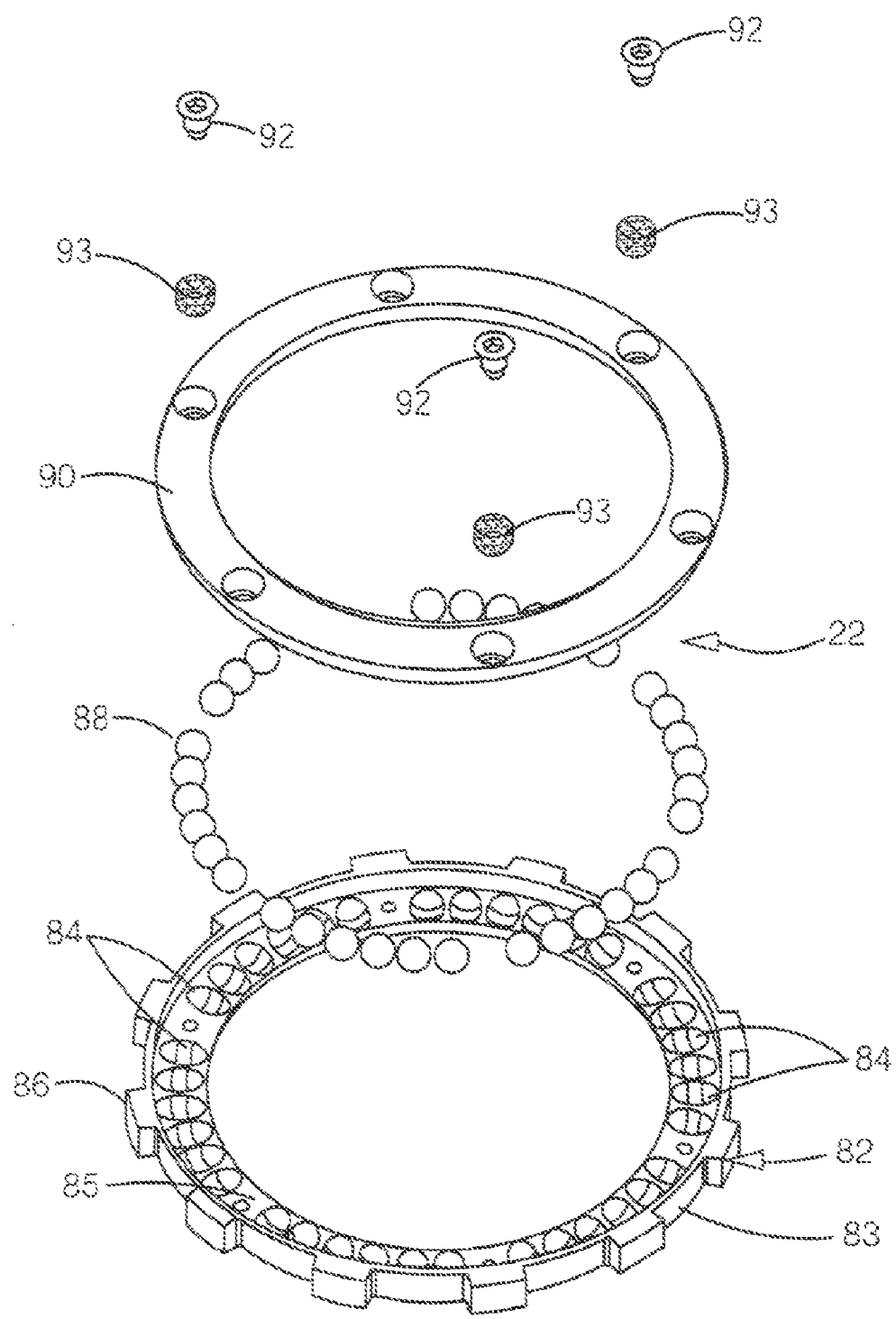
FIG. 8 is an exploded view of the cam ring assembly of the one embodiment.
Figure 9:
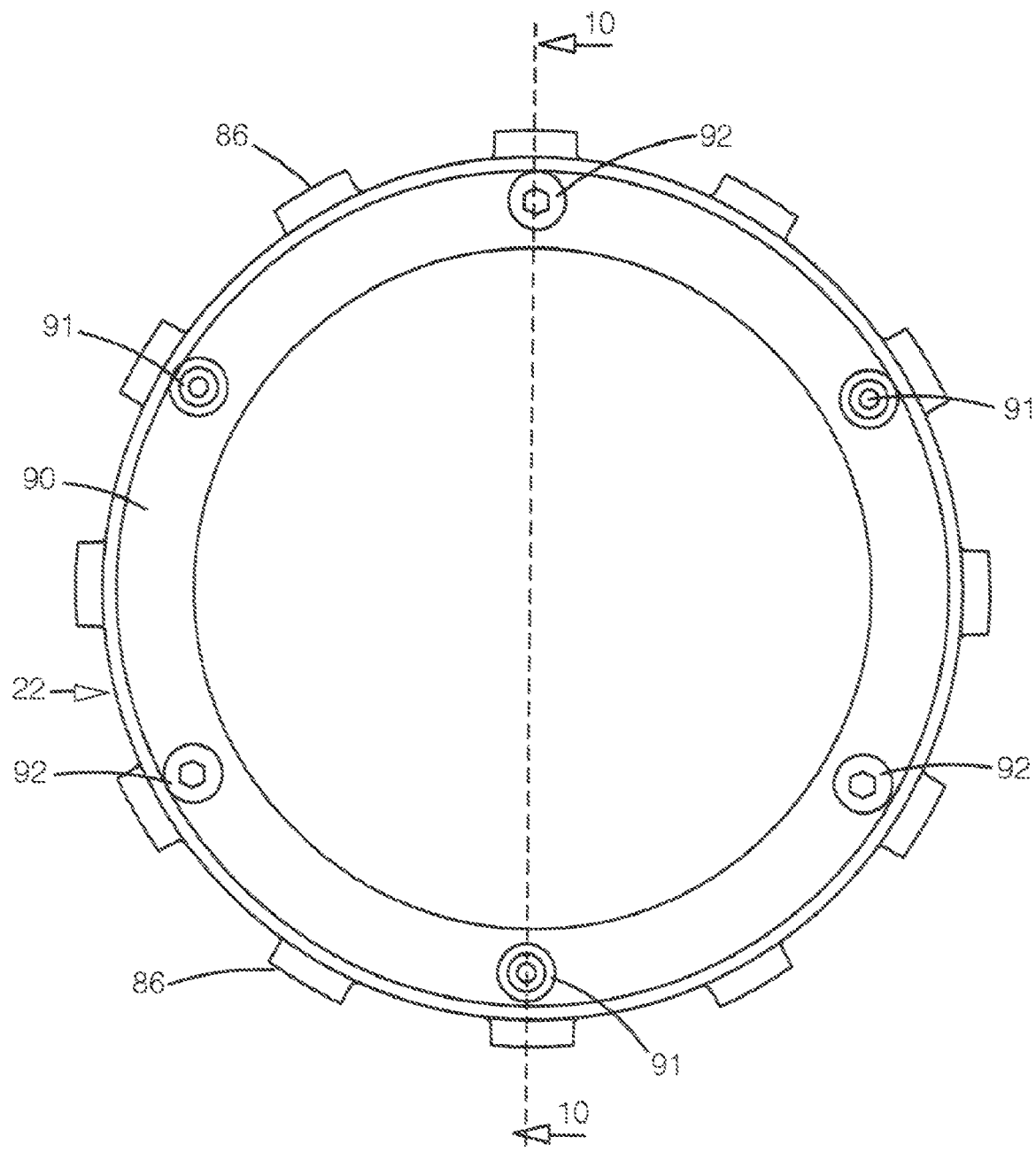
FIG. 9 is a plan view of the cam ring assembly.
Figure 10:
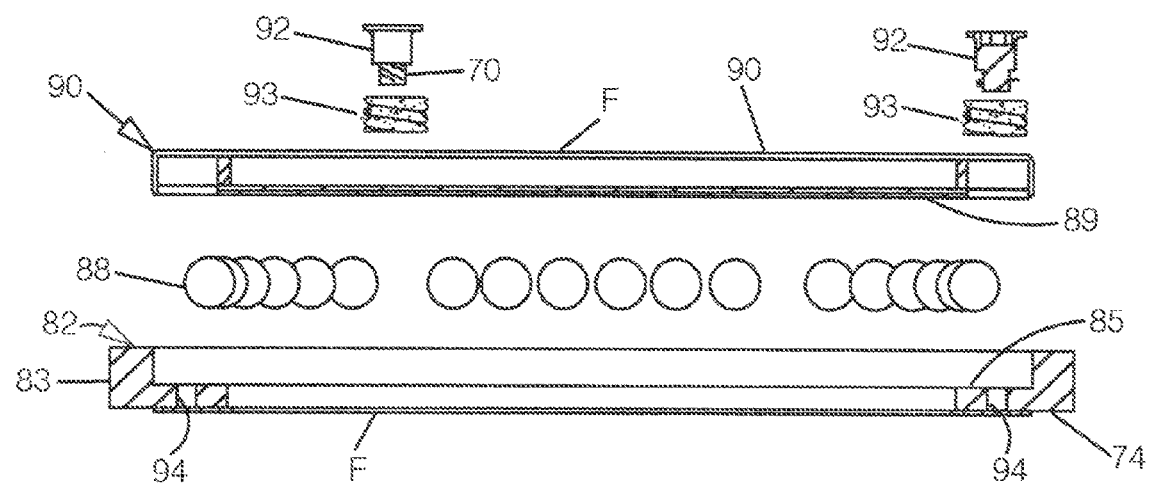
FIG. 10 is an exploded view in section through lines 10-10 of FIG. 9.
Figure 11:
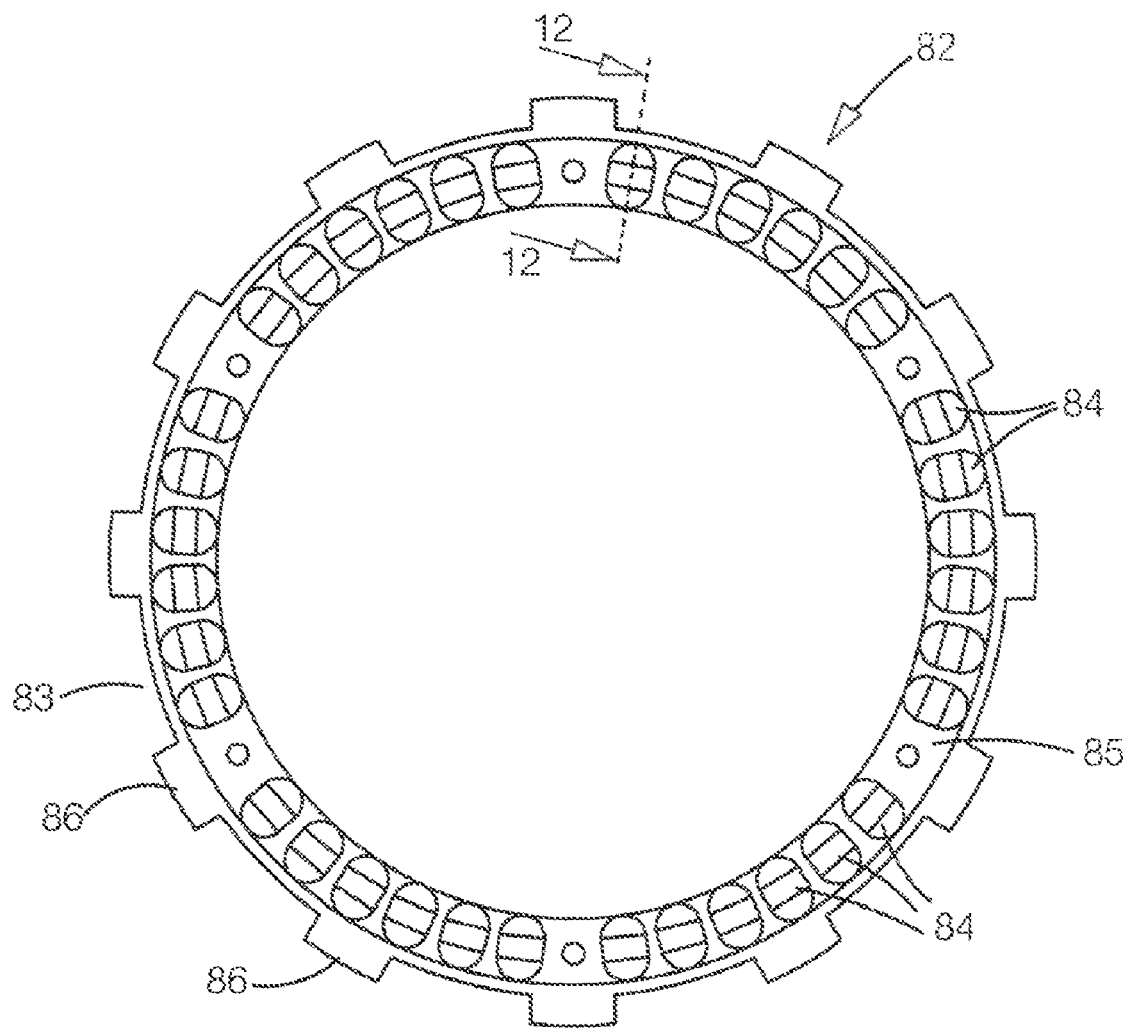
FIG. 11 is a plan view of one of the cam ring tracks of the assembly shown in FIG. 9.
Figure 12:
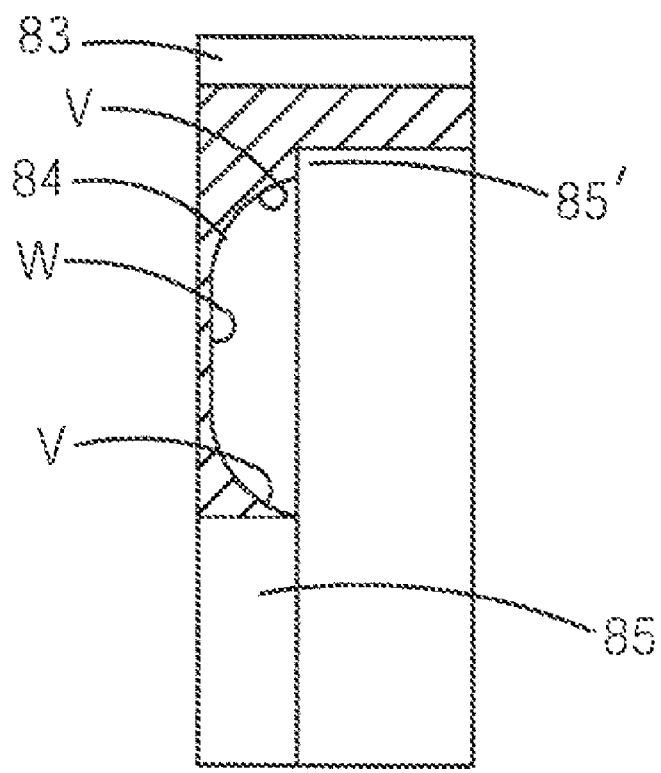
FIG. 12 is an enlarged cross-sectional view taken about lines 12-12 of FIG. 11.
Figures 13, 14:
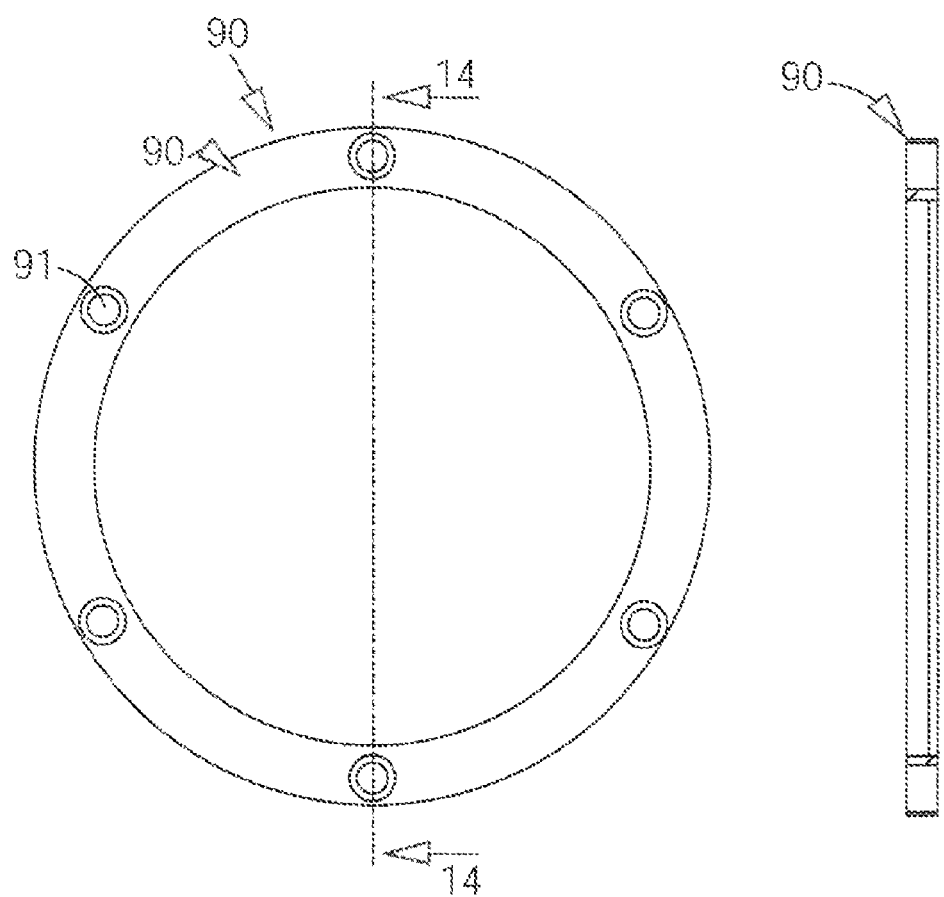
FIG. 13 is a plan view of another cam track of the cam ring assembly that fits within the cam ring portion shown in FIGS. 9 to 12.
FIG. 14 is a cross-sectional view taken about lines 14-14 of FIG. 13.
Figure 15:
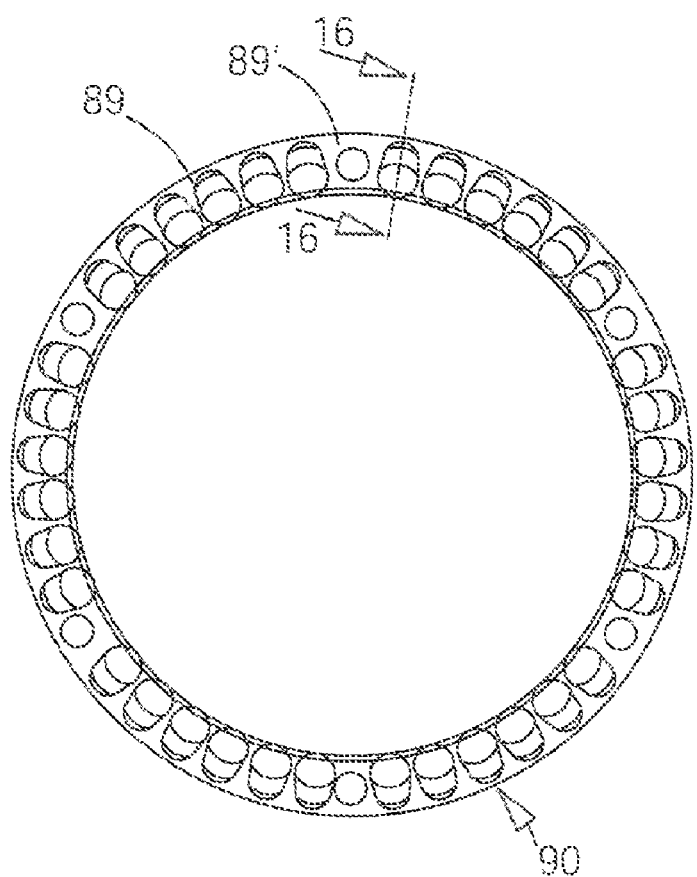
FIG. 15 is a plan view of the inner surface of the cam track shown in FIG. 13.
Figure 16:
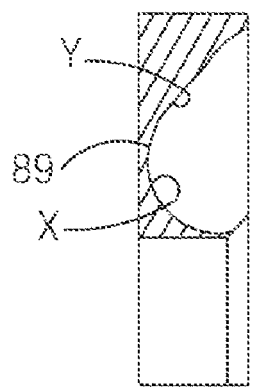
FIG. 16 is an enlarged sectional view taken about lines 16-16 of FIG. 15.
Figure 17:
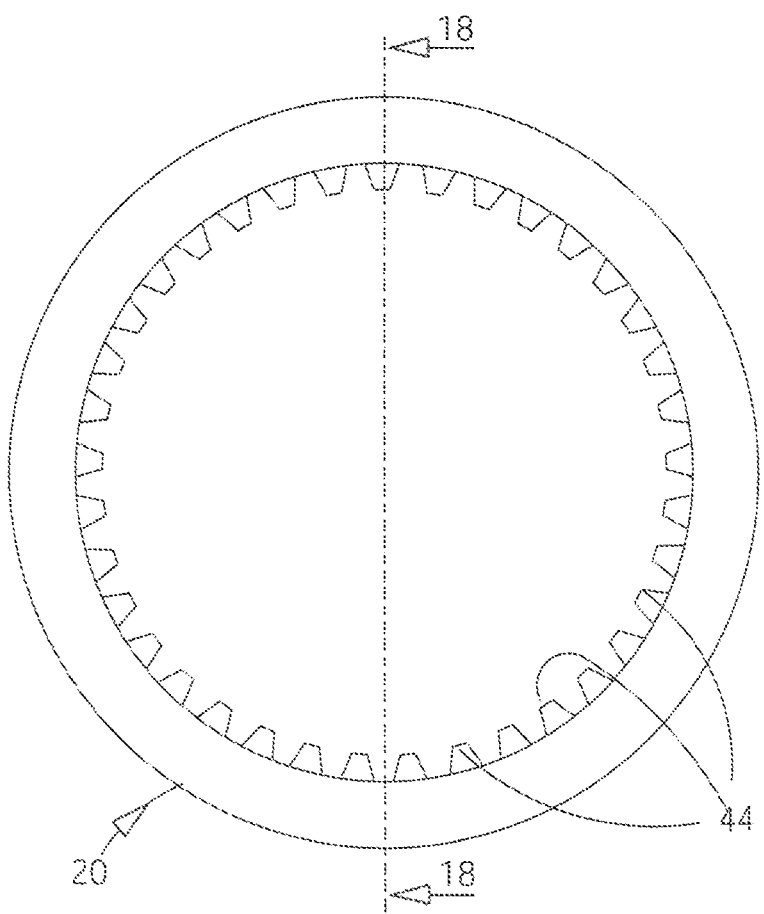
FIG. 17 is a plan view of a clutch plate.
Figure 18:
FIG. 18 is a cross-sectional view taken about lines 18-18 of FIG. 17.
Figure 19:
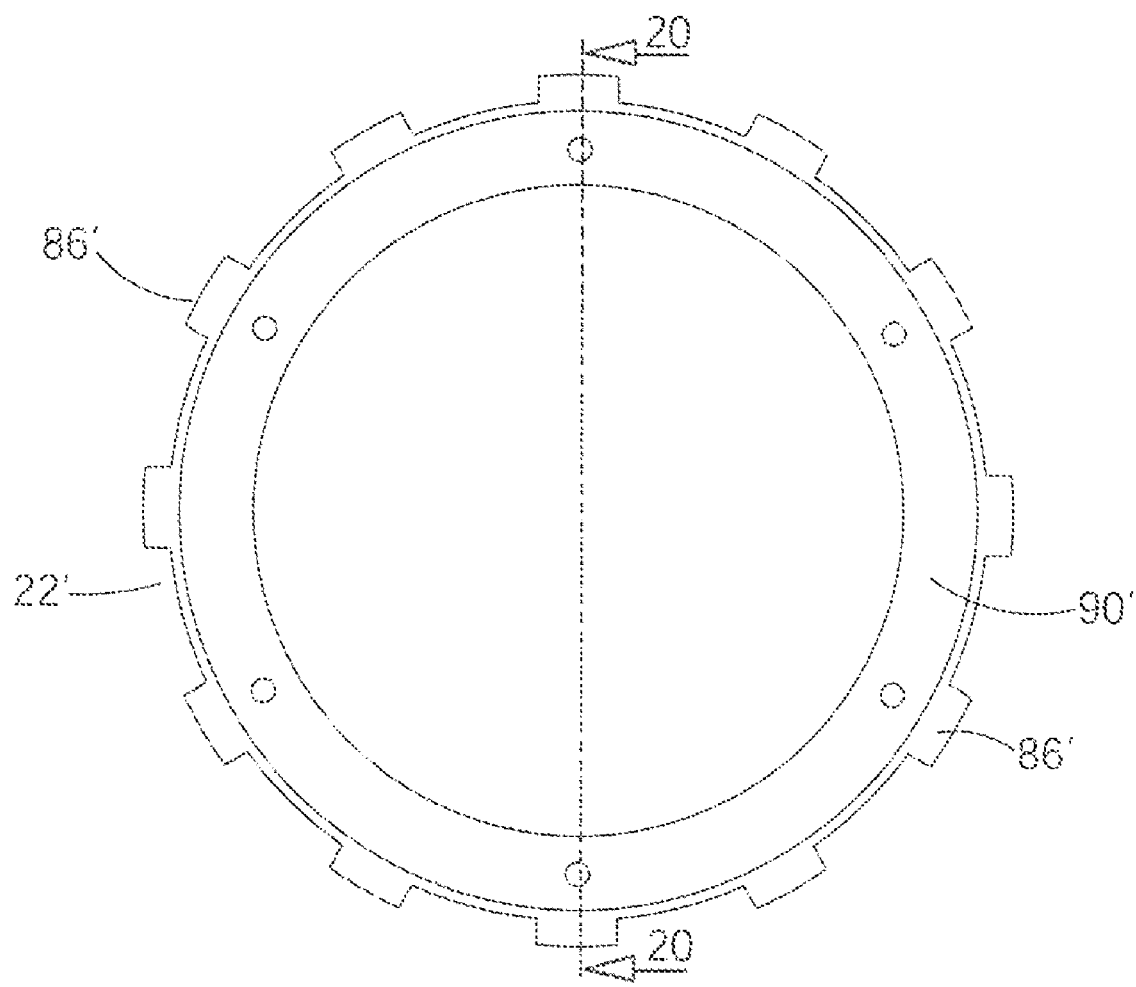
FIG. 19 is a plan view of a modified form of cam track of the cam ring assembly.
Figure 20:
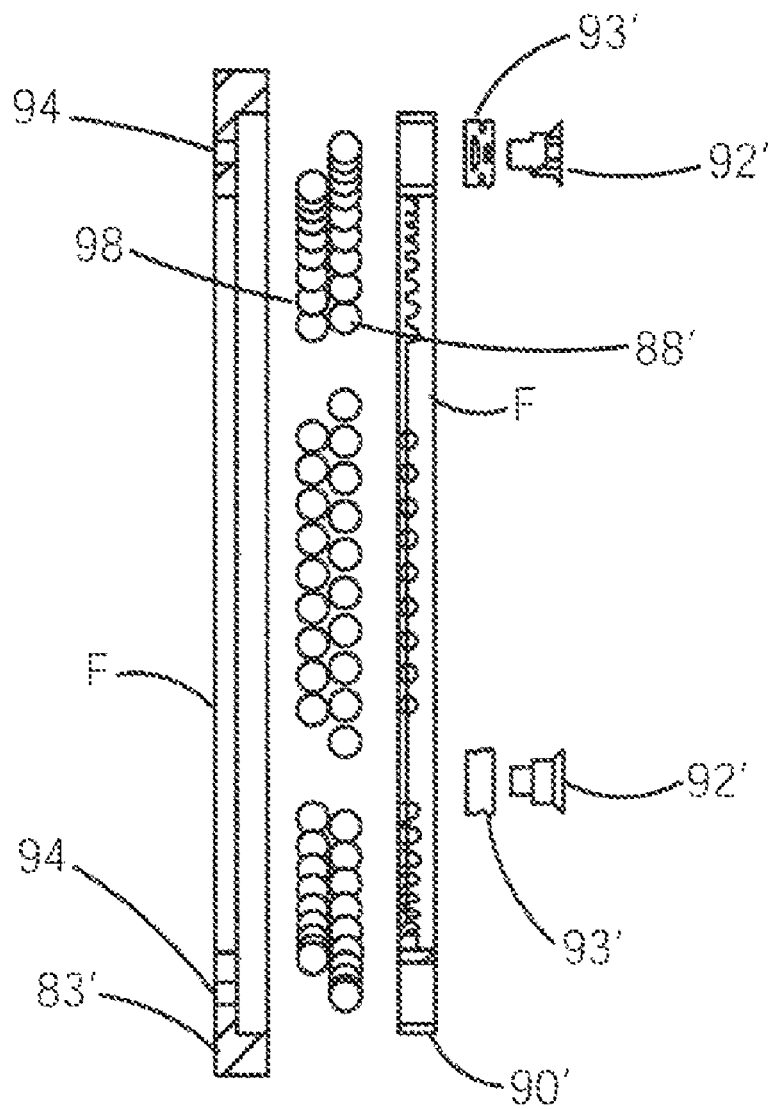
FIG. 20 is a cross-sectional view taken about lines 20-20 of FIG. 19.
Figures 21, 22:
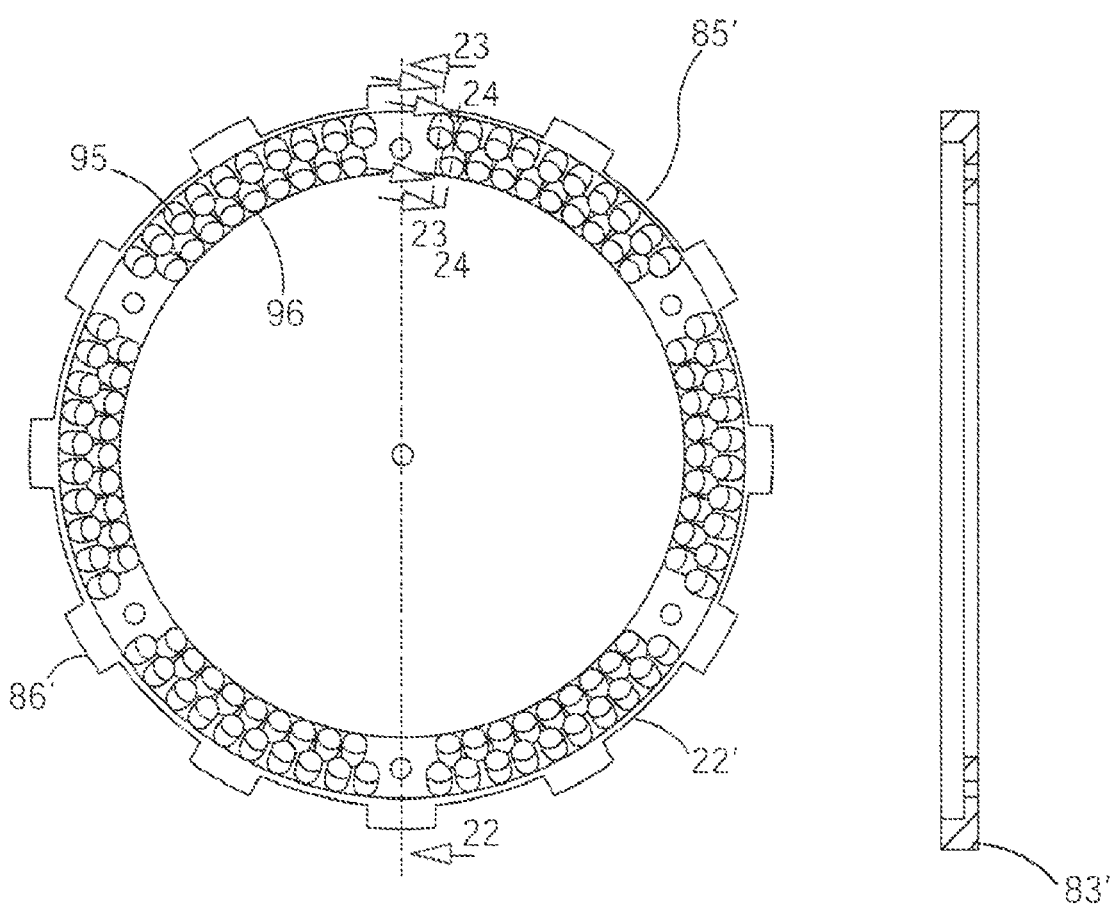
FIG. 21 is a plan view of the modified form of cam ring assembly shown in FIGS. 19 and 20.
FIG. 22 is a cross-sectional view taken about lines 22-22 of FIG. 21.
Figure 25:
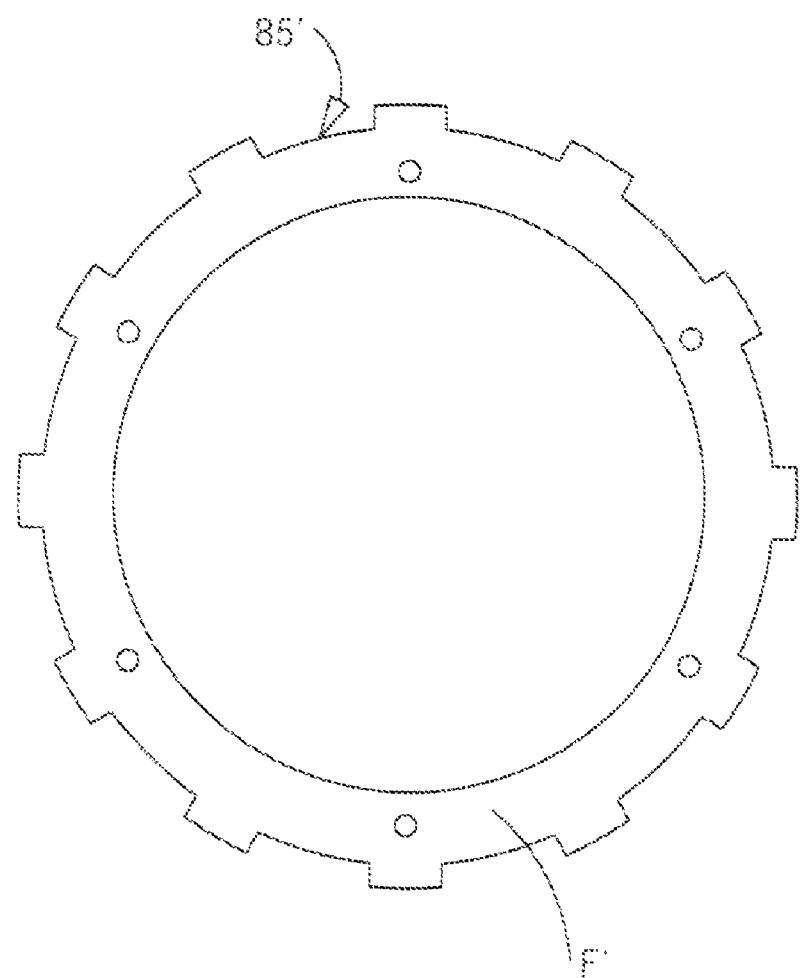
FIG. 25 is a plan view of the outer surface of the modified cam assembly shown in FIG. 21.
Figure 23:
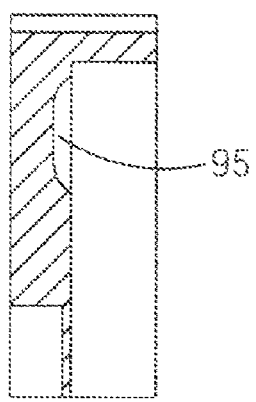
FIG. 23 is an enlarged cross-sectional view taken about lines 23-23 of FIG. 21.
Figure 24:
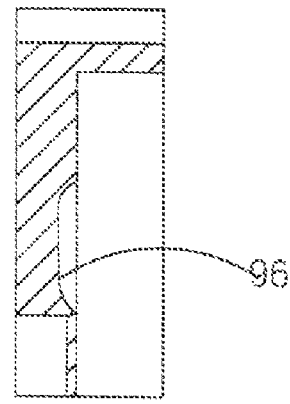
FIG. 24 is a cross-sectional view taken about lines 24-24 of FIG. 21.
Figure 26:
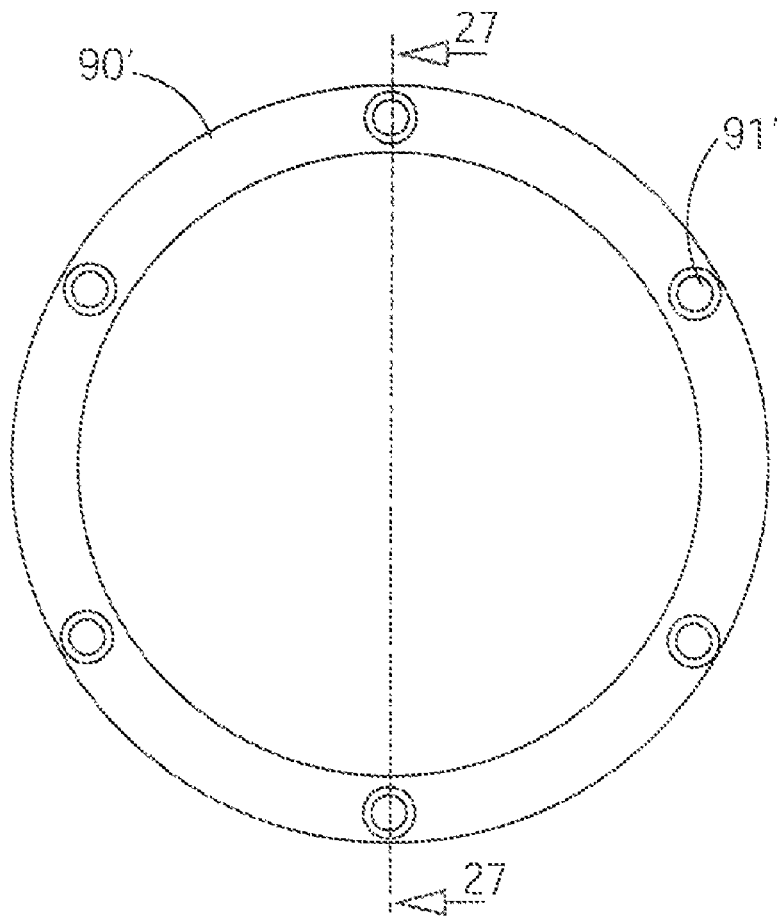
FIG. 26 is a plan view of another cam track which fits into the cam ring portion illustrated in FIG. 21.
Figure 27:
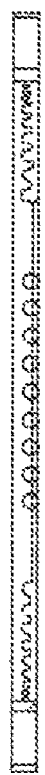
FIG. 27 is a cross-sectional view taken about lines 27-27 of FIG. 26.
Figure 28:
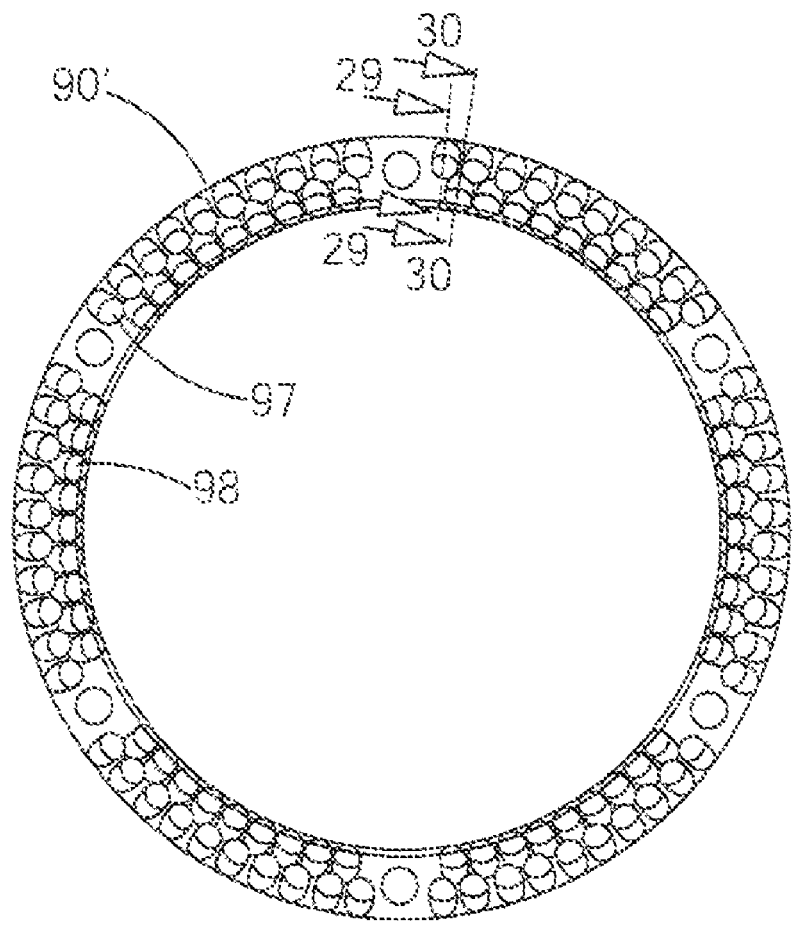
FIG. 28 is a plan view of the inner surface of the cam portion shown in FIG. 26.
Figure 29:
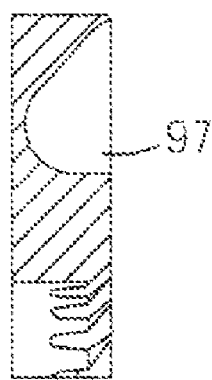
FIG. 29 is a cross-sectional view taken about lines 29-29 of FIG. 28.
Figure 30:
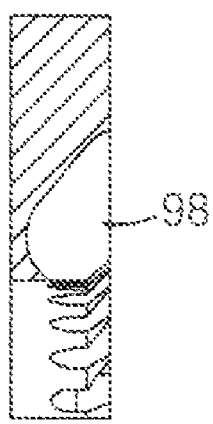
FIG. 30 is a cross-sectional view taken about lines 30-30 of FIG. 28.

As shown in FIGS. 13 to 16, the dynamic expansion ring assembly 22 also has a second cam-receiving portion 90 having a series of indented circumferentially spaced cam faces 89 on an inner surface aligned in opposed facing relation to the cam faces 84. The second cam-receiving portion 90 is inset within the band 83 and secured to the first ring portion 85 by the screw members 92 as best seen in FIG. 10. Each cam face 89 is relatively shallow and flat at W between opposed end surfaces V in comparison with the spherical and inclined surface portions X and Y of each cam face 89. Another continuous friction pad layer F is joined to the outer surface 74 so that, as best seen in FIG. 7, the friction pad layers F are in opposed facing relation to two of the second clutch plates 20 of the clutch basket 12. A series of three screw members 92 are illustrated in FIGS. 8 and 9 and are disposed in equally spaced circumferential relation around the ring assembly 22 but the number of screw members 92 may vary in number up to a total of six, as shown in FIGS. 8 and 9, depending upon the spring-loading required in resisting the expansion force of the cam members 88. The cam members 88 are in the form of ball bearings, each cam member being sized to fit between each pair of confronting cam faces 84 and 89 when the second cam-receiving portion 90 bears against the first cam-receiving portion 85 and, under centrifugal force, the cams 88 will undergo a combination of sliding and rolling movement from the deepest spherical portions X of each cam face 84 radially outwardly along the inclined surface portions Y. The distance of travel of the cam members 88 is sufficient to compress the clutch plates together on opposite sides of the cam ring assembly 22 and force the endmost plate 18 of the clutch pack into engagement with the undersurface portion 52 of the cover plate 28, and the opposite end plate 18 bearing against the base 38 of the hub 16, for example, as illustrated in FIGS. 5 and 5A.

The second cam-receiving portion 90 is normally urged against the first cam-receiving portion 85 by the screw members 92 which are inserted in countersunk bores 91 in the cam-receiving portion 90, and a threaded end 70 of each screw member 92 is threaded into an aligned threaded bore 94, the bores 93 being located at equally spaced circumferential intervals between the cam faces 84. In this way, the screw members 92 are spring-loaded by the compression springs 93, and the spring tension may be regulated to resist radial outward movement of the cam members 88 and expansion of the second ring portion 90 away from the first portion 85 until the clutch reaches a predetermined rotational speed. Most importantly, the dynamic expansion ring assembly 22 imparts substantially equal expansion forces in opposite directions away from the dynamic expansion ring assembly 22 and against the clutch plates 18 and 20 to urge them into clutching engagement. Briefly summarizing from the above, the spherical shape of the cam members 88 and mating faces 84 and 89 minimizes the friction and reduces assembly drag while contributing to a more responsive clutch feel. The position of the dynamic expansion ring assembly 22 in the middle of the clutch basket 12 places the expansion forces closer to the center of mass for the motorcycle clutch and minimizes the likelihood of unbalanced forces otherwise generated in models that are assembled with a pressure plate between one end of a clutch pack and a cover. Further, to minimize wear of the first clutch plates 18 (which comprise fiber), the position of the dynamic expansion ring assembly 22 in the middle of the clutch basket 12 evenly distributes the clutch expansion forces and provides for more uniform disk pack compression. In one embodiment, in order to compensate for the increase in thickness of the dynamic expansion ring assembly 22 which is substituted for a first clutch plate 18, the remaining first clutch plates 18 are machined to their thickness without altering the effectiveness of the clutch pack. This is achieved with a minimum retrofit and substantially no modifications required to the stock original equipment manufacturer ("OEM") parts since the dynamic expansion ring assembly 22 is conformable to the existing OEM clutch pack. Further, utilizing the OEM clutch springs 64 and housing mechanism ensures maximum ease of installation and adjustment for use in the field.

As described in U.S. Pat. No. 7,014,026, assigned to the assignee of the present application, an important characteristic of the special compression springs 93 is their greatly reduced height or travel for a given amount of resistance and can therefore occupy much less space in an axial direction. Preferably, the springs 93 are SPIRA WAVE® wave springs which are flat wire compression springs manufactured and sold by Smalley Steel Ring Co. of Lake Zurich, Ill. Their spring force is such as to resist the spreading of the cam portions 82 and 90 and provides a method to increase or decrease spring force which in turn allows the rider/operator to easily "fine-tune" the clutch engagement.

The maximum clamping force that can be exerted on the first clutch plates 18 and the second clutch plates 20 to assure non-slipping engagement under normal operating conditions is determined by the stock springs 64 of the cover plate 28. The springs 64 permit the clutch to slip in the event that extreme shock loads are transmitted through the drive train. For example, the first clutch plates 18 and the second clutch plates 20 permit some slippage so as to absorb any shock loading when the rear wheel of the motorcycle is off the ground and spinning, and then suddenly stops.

At engine idle, the cover plate 28 normally rides upon the clutch lifter 55 thereby creating the gap G which is finely adjustable (larger and smaller) with the OEM or standard clutch cable adjusters provided with the clutch lever mechanism. The gap G can be reduced to zero by lossening the cap 111 in order to return to a stock clutch set up, this might be desirable in order to "bump" start the engine. Further, as the engine is idling the dynamic expansion ring assembly 22 is in the relaxed position and the spacing between the first clutch plates 18 and second clutch plates 20 is present. As soon as the engine revs higher than idle the dynamic expansion ring assembly 22 expands so that the gap G will close at the end of the clutch basket 12 and the first clutch plates 18 and the second clutch plates 20 move into positive engagement with one another.

In one alternative embodiment, the dynamic expansion ring assembly 22 fits within a stock clutch basket and takes the place of one fiber plate so as to be within the size limits of the standard clutch housings. The dynamic expansion ring assembly 22 can be considered a fiber plate as it has the fiber material bonded on both sides. As space is an issue, one additional fiber plate is removed, however, the surface area of the fiber on the dynamic expansion ring assembly 22 is on average that of 1.5 clutch plates. As you lose one fiber plate you also lose one steel plate. In order to provide additional space, the steel plates are machined on one side to the size of the inside diameter of the fiber.

In another aspect of the present invention, a method for converting a standard manufacturer manual clutch into a centrifugal clutch begins with positioning a dynamic expansion ring assembly 22 into a clutch basket 12 as a substitute for a first clutch plate 18 comprising fiber. Next, a gap G is set by changing a tension in a clutch cable wherein loosening a cable tension by lengthening the clutch cable results in the increasing of the gap G. Similarly, shortening the length of the clutch cable decreases the gap G and results in the first clutch plates 18 and the second clutch plates 20 in contact with each other thereby permitting a bump start by "popping of the clutch."

A modified form of dynamic expansion ring assembly 22' is illustrated in FIGS. 19 to 30 wherein like parts are correspondingly enumerated with prime numbers. The modified form comprises multiple staggered rows of cam faces 95 and 96 for cam members 88' and 98 in the cam-receiving portion 85'; and cam faces 97 and 98 for the cam-receiving portion 90; however, the indented inner radial row 96 of cam faces are shorter only to accommodate a series of smaller cam members or balls 98 and in this relation, two or more staggered concentric rows of ball bearings are employed as set forth and described in U.S. Pat. No. 7,140,480, assigned to the assignee of this application.

In use, one or more adjustments may be made in the dynamic expansion ring assembly 22 or 22' including but not limited to changing the number of cam members in a single row, reducing the spring tension of the springs 93 or changing the number of spring-loaded screw members 92 in regulating the resistance to expansion of the dynamic expansion ring assembly 22. If the number of the spring-loaded screw members 92 is varied it is still important that they be symmetrically spaced about the dynamic expansion ring assembly 22 and apply equal tension or resistance to expansion. When the dynamic expansion ring assembly 22 is expanded in response to displacement of the cam members 88 to lock the first clutch plates 18 and the second clutch plates 20 together, the hub 16 then imparts the rotation of the clutch housing H to the transmission shaft 14. The spring force of the spring-loaded screw members 92 is such as to resist spreading of the dynamic expansion ring assembly 22 beyond a pre-determined limit which is the maximum pumping force that can be safely exerted on the first clutch plates 18 and the second clutch plates 20 to assure a non-slipping engagement but which will permit the clutch plates 18 and 20 to slip in the event that extreme shock loads are transmitted through the drive train. In order to override the automatic clutch, the control rod 26 is operated by the manual clutch lever L to advance against the clutch lifter and cover plate 28 to form a sufficient clearance space or gap G between cover plate 28 and the end plate of the first clutch plates 18.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claim.

I claim as my invention the following:

1. A hydraulic clutch assembly for utilization with an engine of a motorcycle, the hydraulic clutch assembly comprising:
   a master cylinder having reservoir of fluid, the master cylinder mounted on a handle bar of a motorcycle;
   an adjuster component attached to the master cylinder, the adjuster component comprising a body, a piston and a cap, the body comprising a base section engaging the master cylinder and a cylinder section extending from the base section and having an aperture, the aperture in flow communication with the reservoir of fluid, the piston disposed within the aperture of the cylinder section, the cap threadingly connected to the cylinder section;
   a slave component in flow communication with the reservoir of fluid;
   a clutch basket;
   a cover plate mounted on the clutch basket, the cover plate having an undermost portion, the cover plate in connection with the slave component;
   a plurality of first clutch plates positioned within the clutch basket, each of the plurality of first clutch plates comprising a non-metal material;
   a plurality of second clutch plates positioned within the clutch basket, each of the plurality of second clutch plates composed of a metal material;
   a dynamic expansion ring assembly positioned substantially in a middle of the clutch basket, the dynamic expansion ring comprising a first cam ring portion, a second cam ring portion and a plurality of cam members held between the first cam ring portion and the second cam ring portion in a plurality of cam receiving portions, wherein the plurality of cam members are capable of moving inward and outward in each of the plurality of cam receiving portions;
   wherein the dynamic expansion ring assembly imparts substantially equal expansion forces in opposite directions away from the dynamic expansion ring assembly and against the plurality of first clutch plates and the plurality of second clutch plates to urge them into clutching engagement;
   wherein a gap is present between the cover plate and an end plate of the plurality of first clutch plates when the engine is at an idle speed and each of the plurality of cam members is positioned radially inward in the dynamic expansion ring assembly, and the gap is not present when the engine is operating faster than idle and each of the plurality of cam members is positioned radially outward in the dynamic expansion ring assembly by centrifugal force;
   wherein the gap is adjustable by tightening the cap to increase the size of the gap and loosening the cap to decrease the size of the gap.

* * * * *